United States Patent
Shidara et al.

(10) Patent No.: US 8,925,819 B2
(45) Date of Patent: Jan. 6, 2015

(54) WIRELESS TAG PROCESSOR

(75) Inventors: Kenichi Shidara, Kanagawa (JP);
Masahiko Mizumura, Kanagawa (JP);
Miyuki Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 698 days.

(21) Appl. No.: 13/274,919

(22) Filed: Oct. 17, 2011

(65) Prior Publication Data
US 2012/0249305 A1 Oct. 4, 2012

(30) Foreign Application Priority Data

Mar. 29, 2011 (JP) ................... 2011-073050

(51) Int. Cl.
*H04Q 5/22* (2006.01)
(52) U.S. Cl.
USPC ....... 235/451; 340/10.1; 340/10.4; 340/10.51
(58) Field of Classification Search
USPC ..................... 235/451; 340/10.1, 10.4, 10.51
See application file for complete search history.

(56) References Cited

U.S. PATENT DOCUMENTS

| | | | |
|---|---|---|---|
| 2009/0051497 A1* | 2/2009 | Miyaso | 340/10.4 |
| 2009/0072952 A1* | 3/2009 | Niiyama et al. | 340/10.51 |
| 2009/0079543 A1* | 3/2009 | Nonaka et al. | 340/10.1 |

FOREIGN PATENT DOCUMENTS

| | | |
|---|---|---|
| JP | A-2005-157645 | 6/2005 |
| JP | A-2005-339507 | 12/2005 |
| JP | A-2007-316987 | 12/2007 |
| JP | A-2008-021070 | 1/2008 |
| JP | A-2009-70190 | 4/2009 |

OTHER PUBLICATIONS

Aug. 12, 2014 Office Action issued in Japan Application No. 2011-073050 (with English Translation).

* cited by examiner

*Primary Examiner* — Allyson Trail
(74) *Attorney, Agent, or Firm* — Oliff PLC

(57) ABSTRACT

A wireless tag processor includes a radio wave transmitting unit that has plural rows of transmitting part groups each having plural transmitting parts that transmit radio waves, the transmitting parts being aligned along a first direction, and the groups being provided in a second direction crossing the first direction, and that transmits radio waves to a wireless tag provided on a medium, and a control section that makes radio waves be transmitted from plural transmitting parts that is arranged staggered, among two rows of the transmitting parts included in the transmitting part groups that are adjacent to each other in the second direction crossing the first direction, and then, makes radio waves be transmitted from other transmitting parts included in the two rows of transmitting parts.

18 Claims, 23 Drawing Sheets

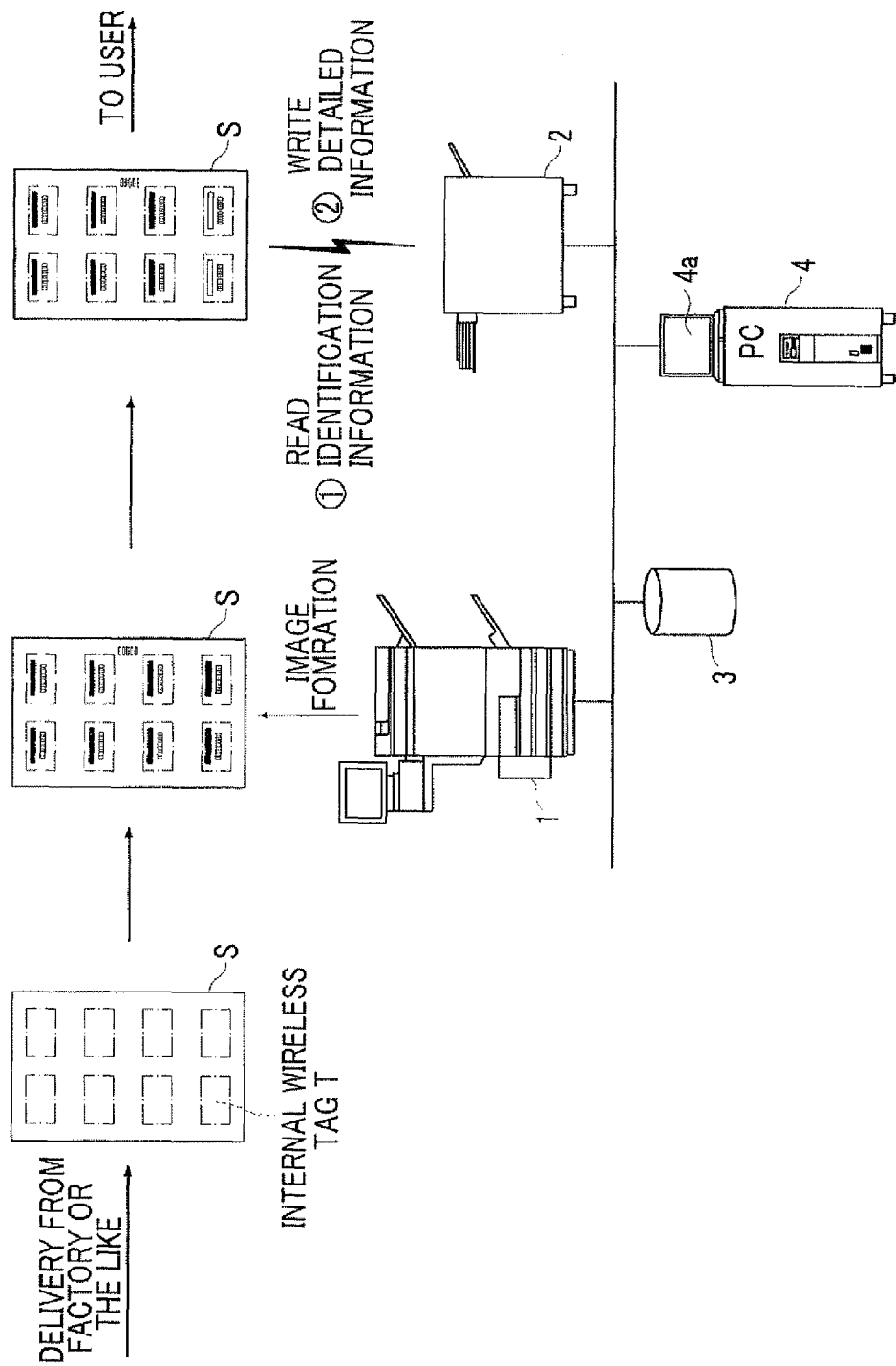

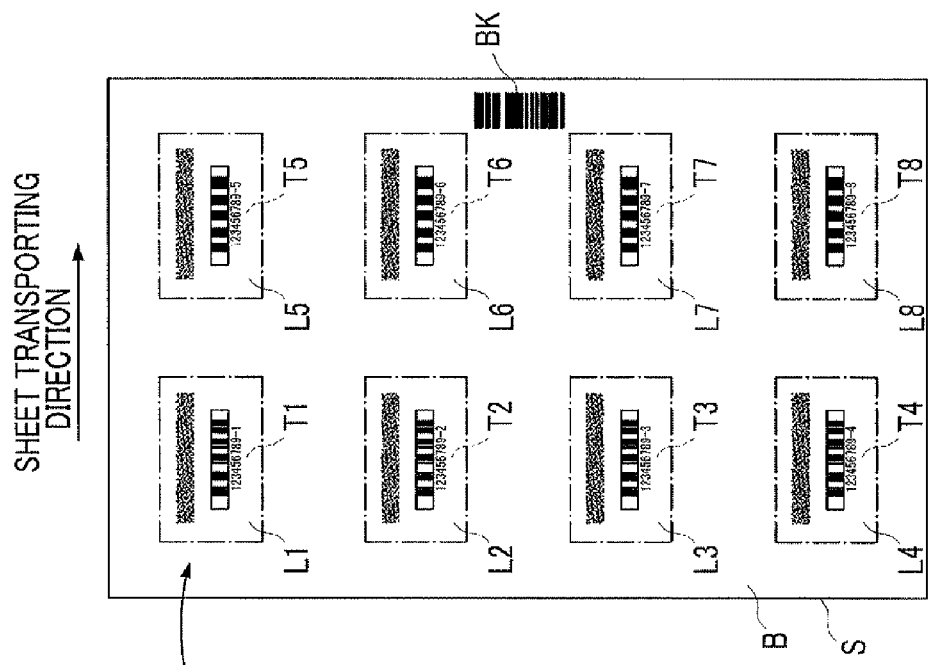
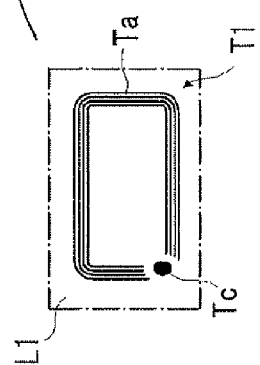

FIG. 3

EXAMPLES OF INFORMATION STORED IN DATA SERVER

| SHEET IDENTIFICATION NUMBER | IDENTIFICATION INFORMATION | POSITIONAL INFORMATION (X, Y) | LIBRARY NAME | BARCODE INFORMATION | BOOK TITLE | PUBLISHING COMPANY | AUTHOR |
|---|---|---|---|---|---|---|---|
| 200707010001 | | (X1, Y1) | AA LIBRARY | 123456789-1 | AAA | A COMPANY | AA |
| | | (X1, Y2) | AA LIBRARY | 123456789-2 | AAA | A COMPANY | AA |
| | | (X1, Y3) | AA LIBRARY | 123456789-3 | AAA | A COMPANY | AA |
| | | (X1, Y4) | AA LIBRARY | 123456789-4 | BBB | B COMPANY | BB |
| | | (X2, Y1) | BB LIBRARY | 123456789-5 | CCC | C COMPANY | CC |
| | | (X2, Y2) | BB LIBRARY | 123456789-6 | DDD | D COMPANY | DD |
| | | (X2, Y3) | BB LIBRARY | 123456789-7 | EEE | E COMPANY | EE |
| | | (X2, Y4) | BB LIBRARY | 123456789-8 | EEE | E COMPANY | EE |
| | | (X1, Y1) | BB LIBRARY | 123456789-9 | EEE | E COMPANY | EE |
| | | (X1, Y2) | BB LIBRARY | 123456789-10 | FFF | F COMPANY | FF |
| | | (X1, Y3) | BB LIBRARY | 123456789-11 | GGG | F COMPANY | GG |
| 200707010002 | | (X1, Y4) | CC LIBRARY | 123456789-12 | HHH | F COMPANY | HH |
| | | (X2, Y1) | CC LIBRARY | 123456789-13 | JJJ | G COMPANY | JJ |
| | | (X2, Y2) | CC LIBRARY | 123456789-14 | KKK | H COMPANY | KK |
| | | (X2, Y3) | CC LIBRARY | 123456789-15 | LLL | H COMPANY | LL |
| | | (X2, Y4) | CC LIBRARY | 123456789-16 | MMM | H COMPANY | MM |
| | | (X1, Y1) | CC LIBRARY | 123456789-17 | MMM | H COMPANY | MM |
| | | (X1, Y2) | CC LIBRARY | 123456789-18 | MMM | H COMPANY | MM |

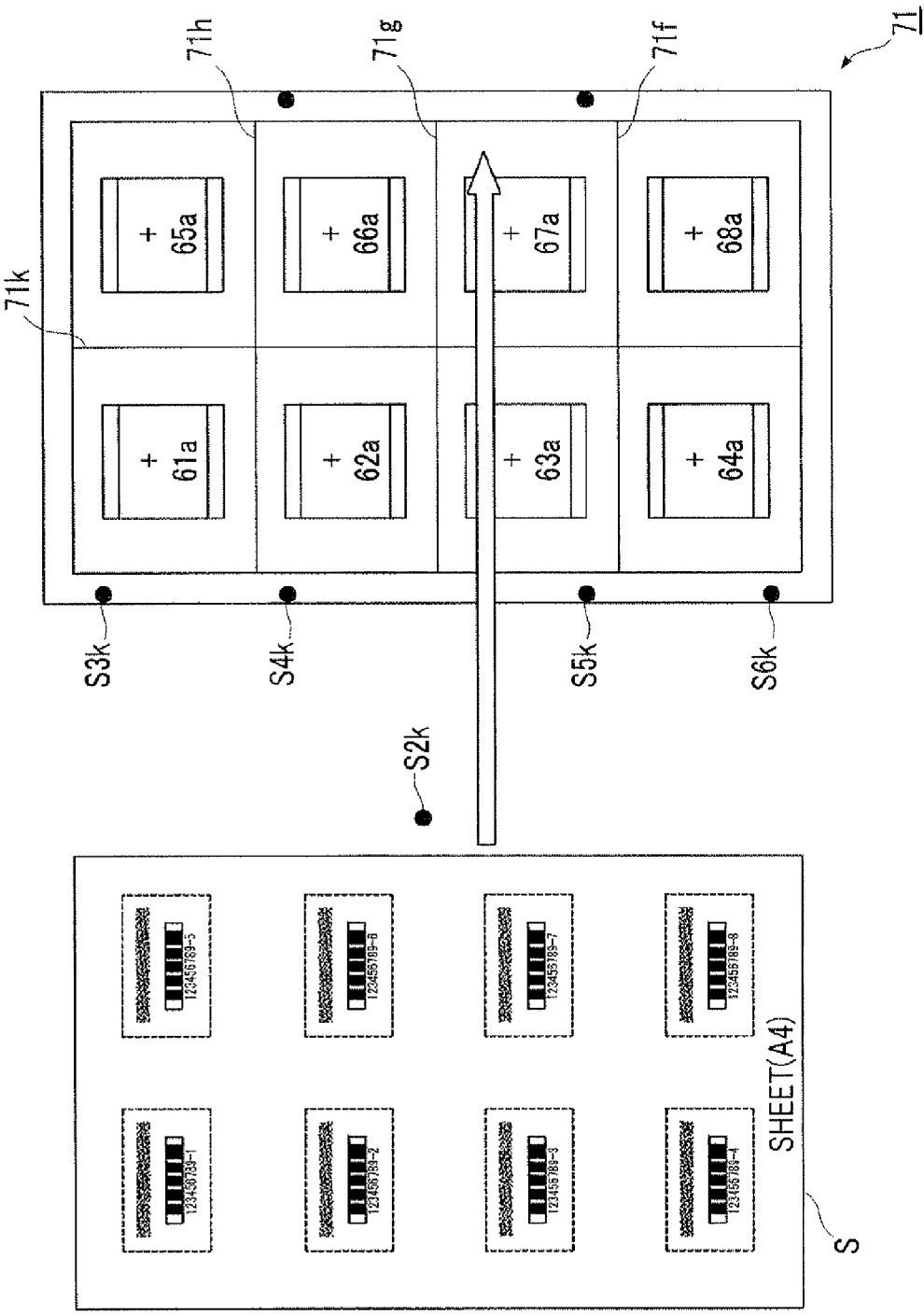

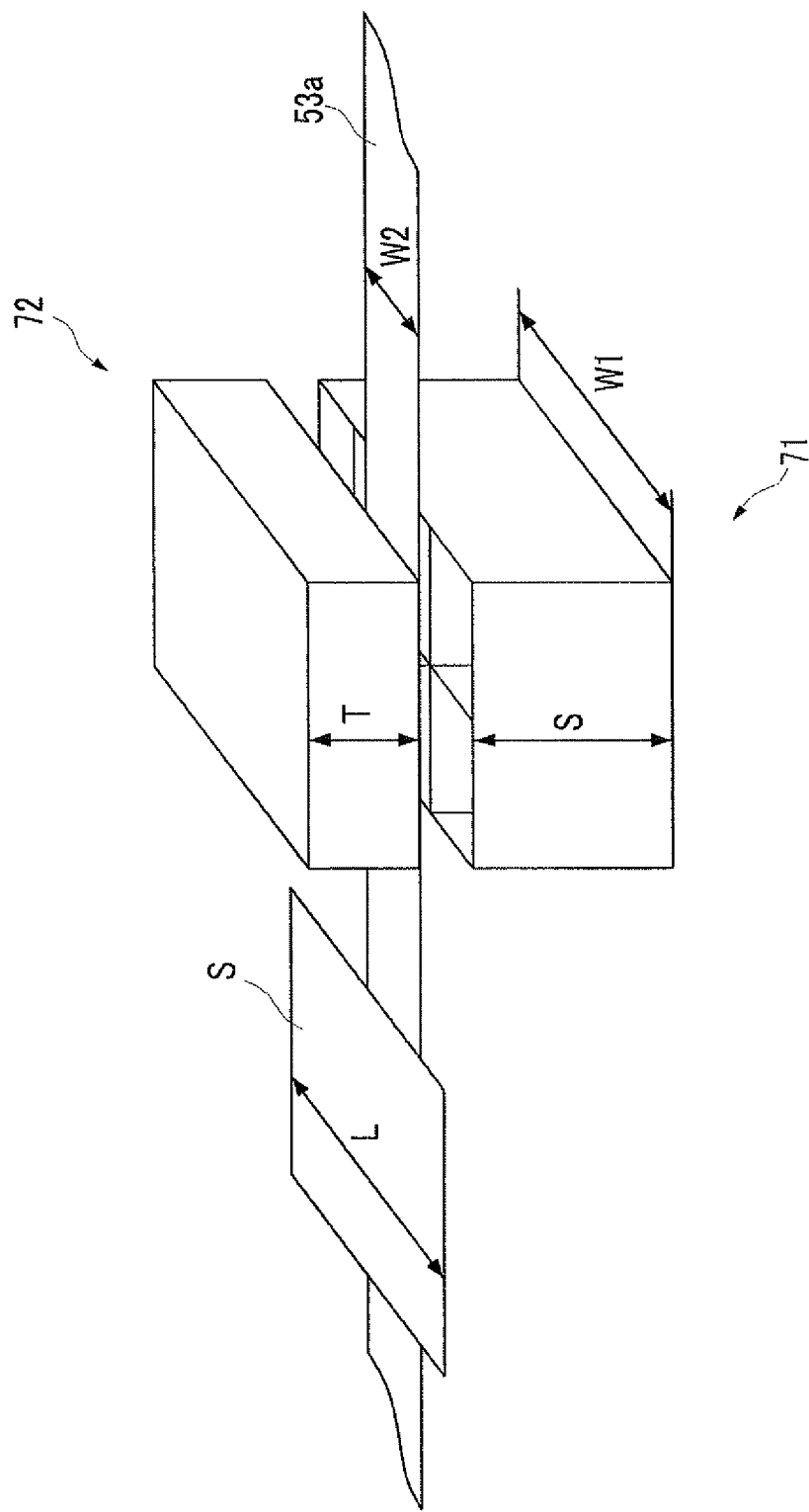

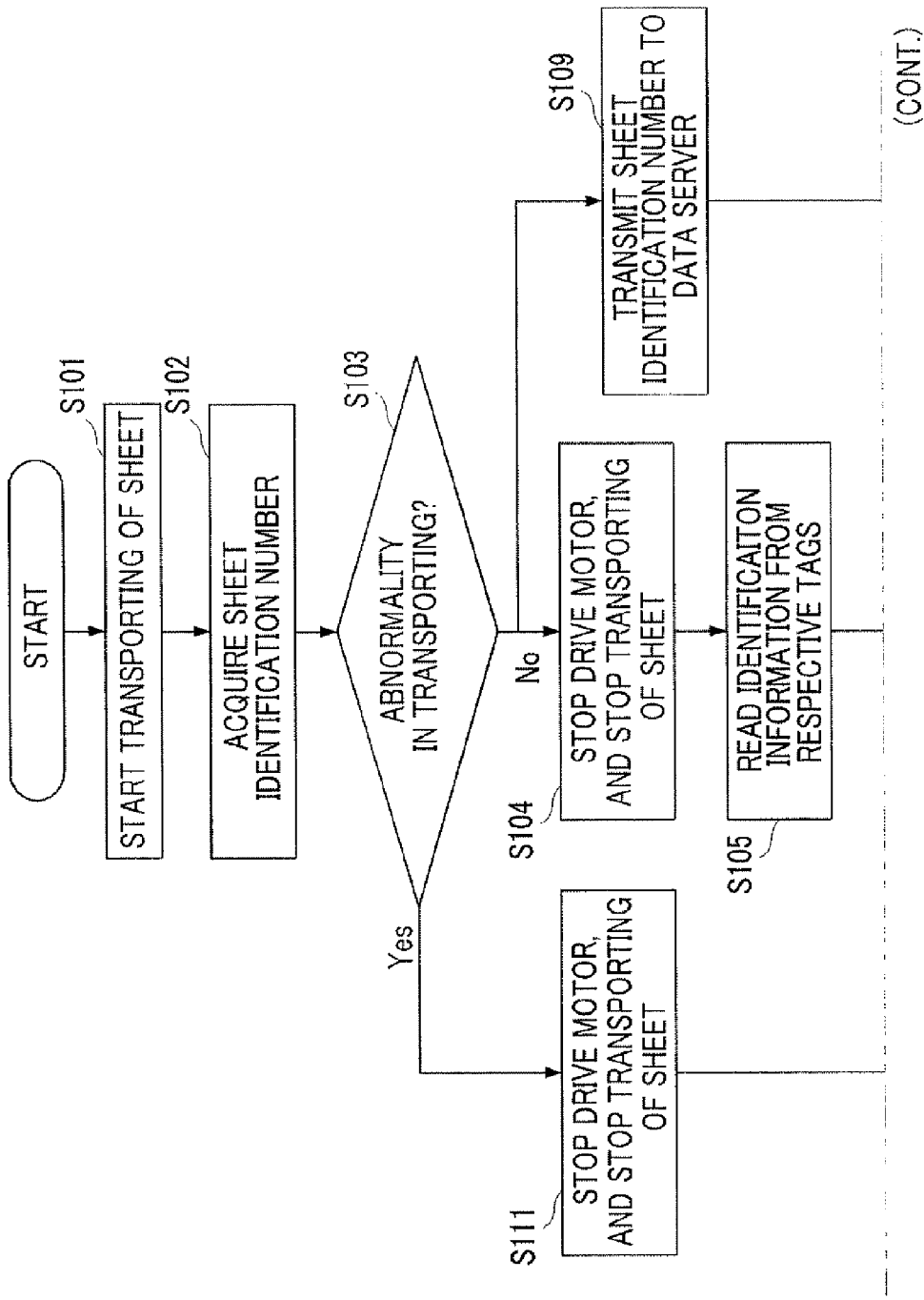

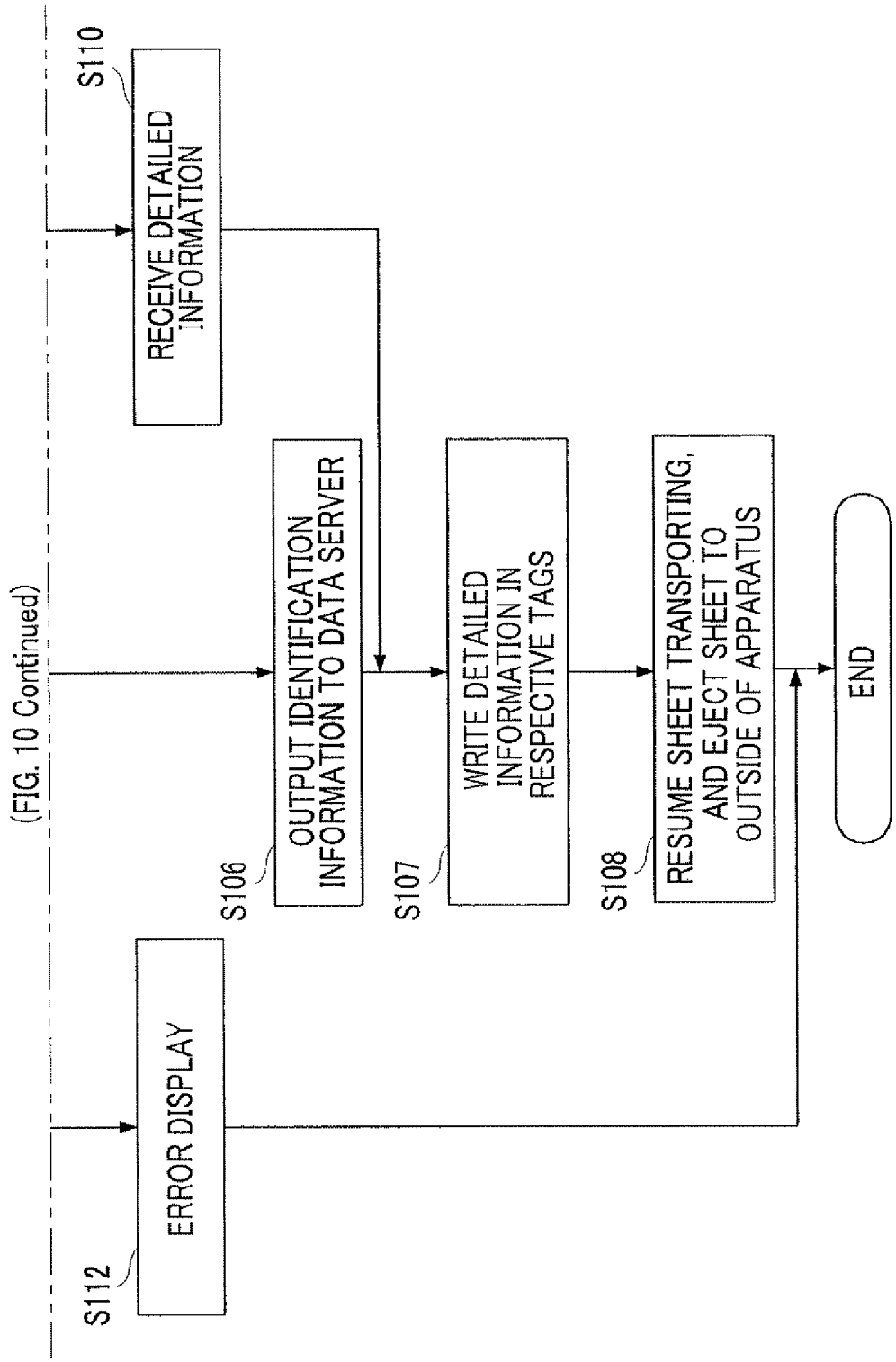

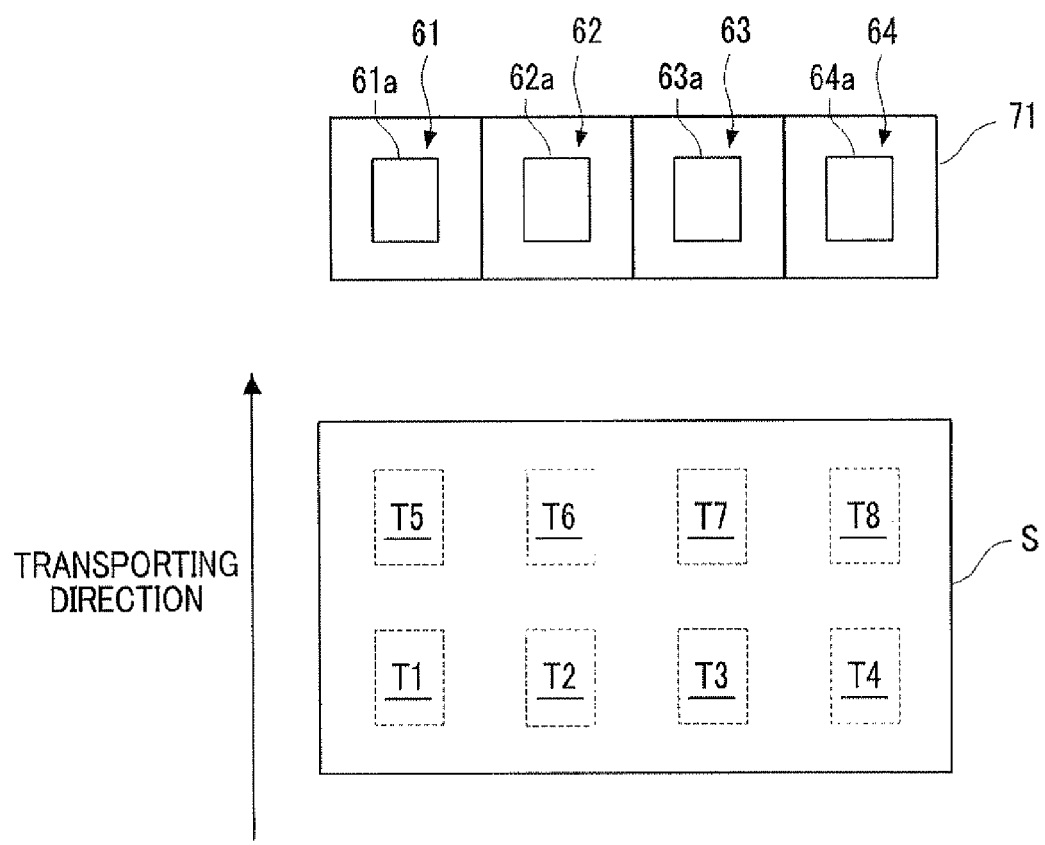

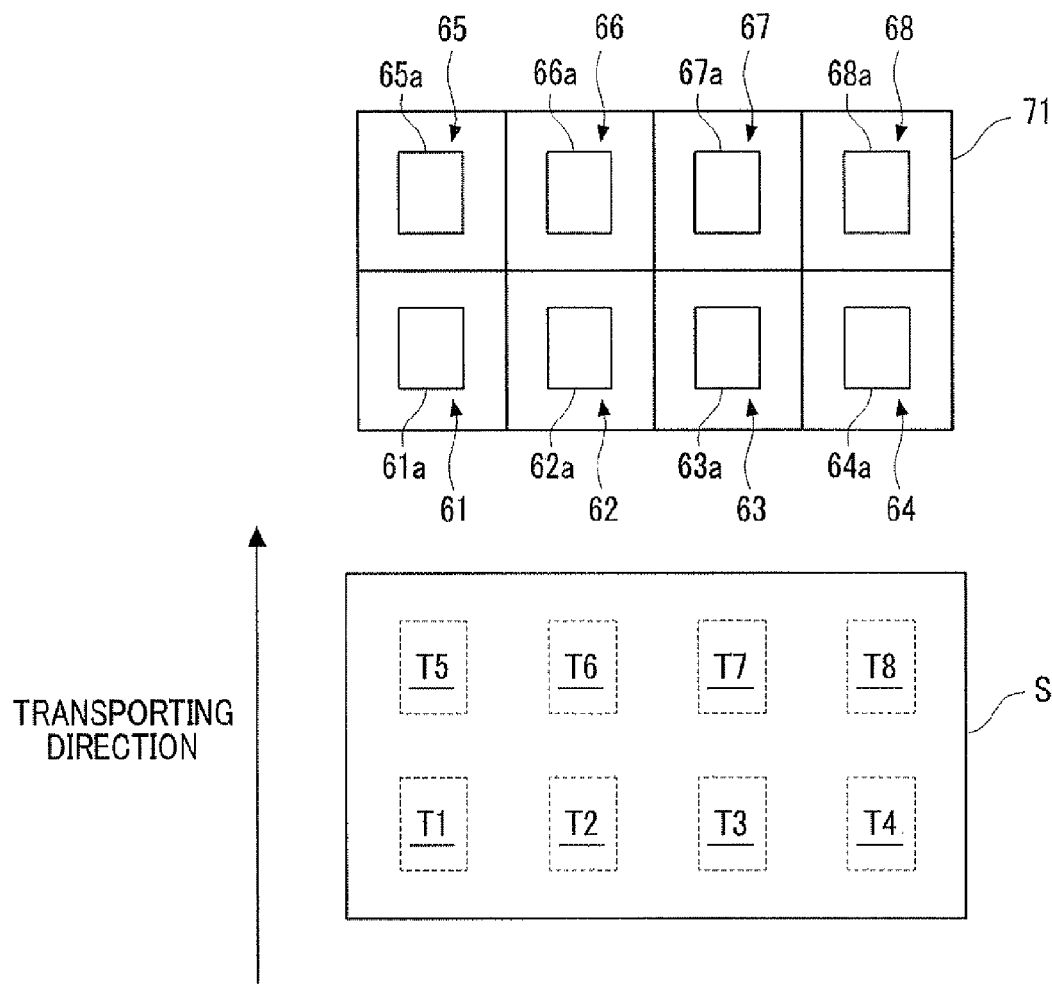

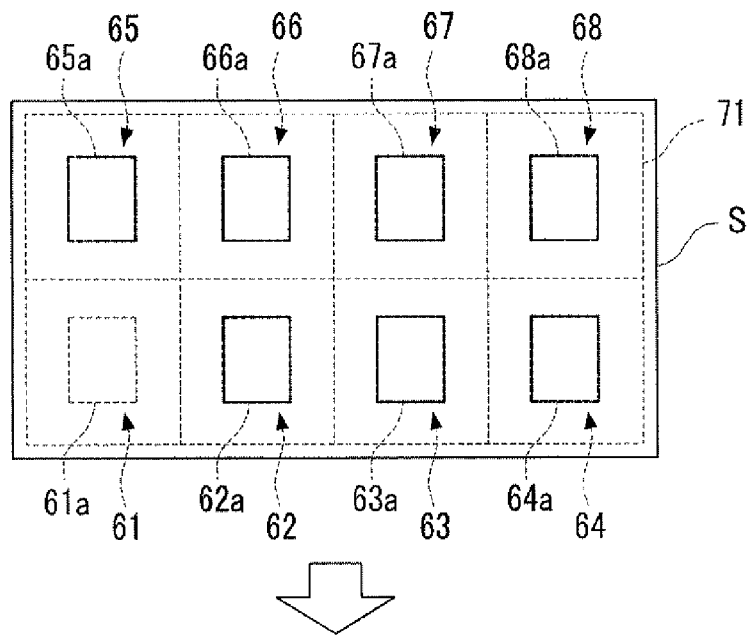
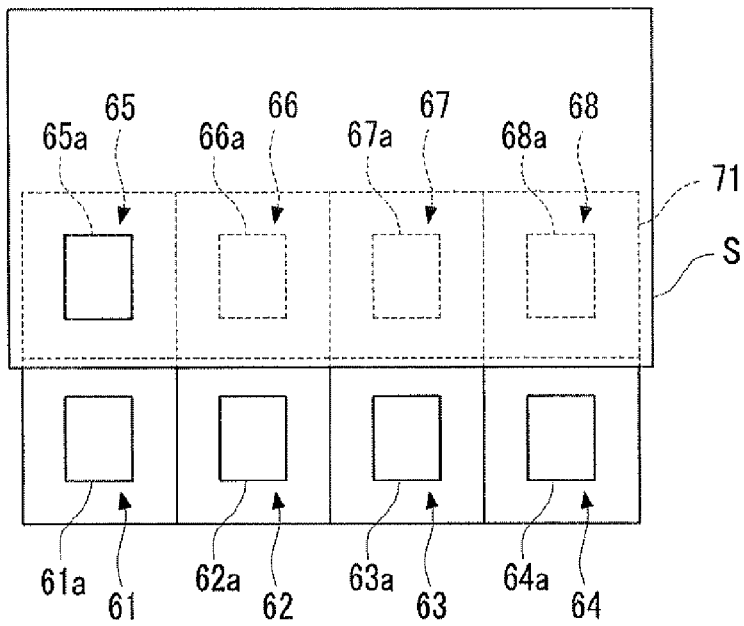

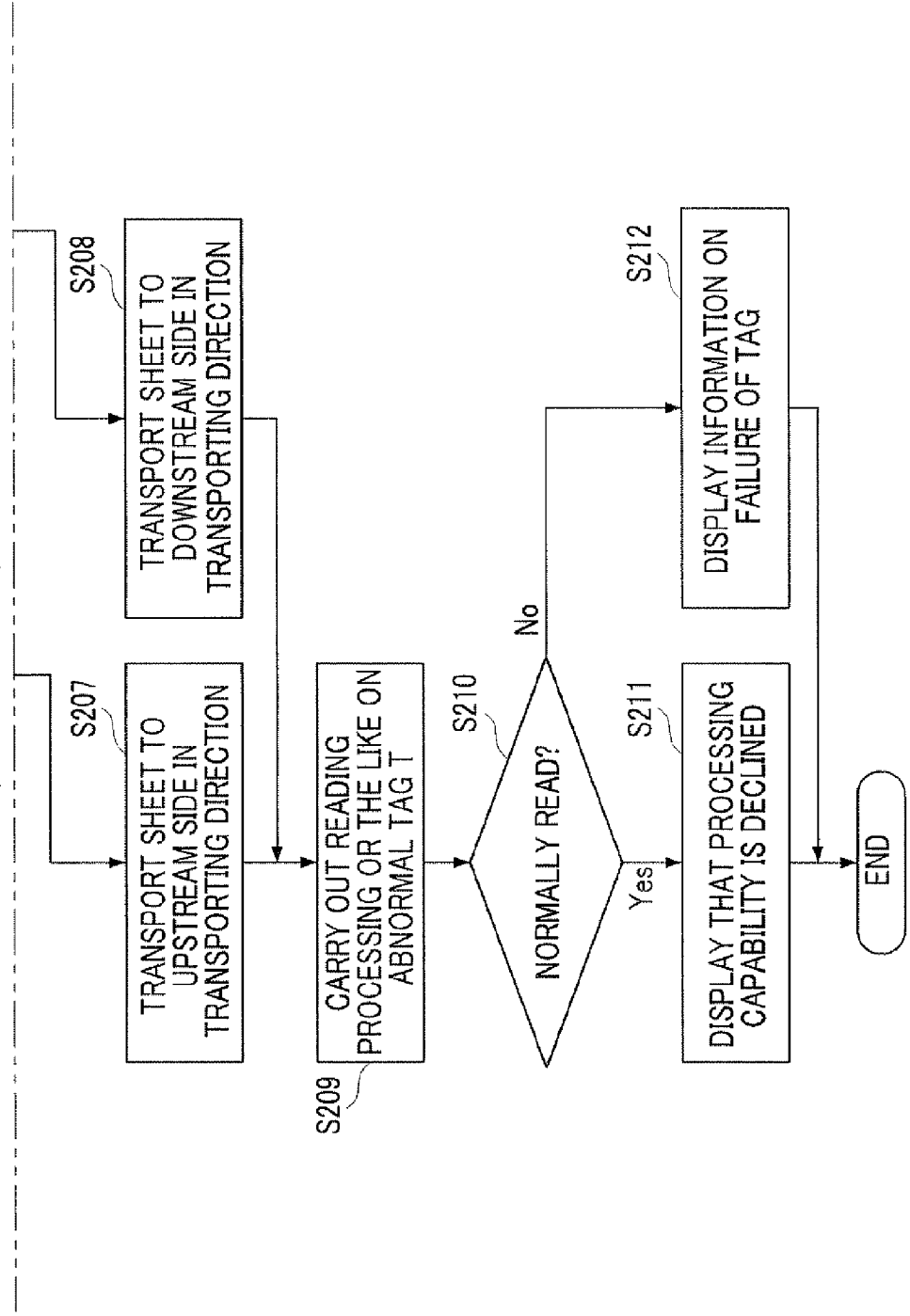

WIRELESS TAG PROCESSOR

CROSS-REFERENCE TO RELATED APPLICATIONS

This application is based on and claims priority under 35 USC 119 from Japanese Patent Application No. 2011-073050 filed Mar. 29, 2011.

BACKGROUND

1. Technical Field

The present invention relates to a wireless tag processor.

2. Summary

According to an aspect of the invention, there is provided a wireless tag processor including a radio wave transmitting unit that has plural rows of transmitting part groups each having plural transmitting parts that transmit radio waves, the transmitting parts being aligned along a first direction, and the groups being provided in a second direction crossing the first direction, and that transmits radio waves to a wireless tag provided on a medium; and a control section that makes radio waves be transmitted from plural transmitting parts that is arranged staggered, among two rows of the transmitting parts included in the transmitting part groups that are adjacent to each other in the second direction crossing the first direction, and then, makes radio waves be transmitted from other transmitting parts included in the two rows of transmitting parts.

BRIEF DESCRIPTION OF THE DRAWINGS

Exemplary embodiments of the present invention will be described in detail based on the following figures, wherein:

FIG. 1 is a schematic configuration view showing a processing system in the present exemplary embodiment;

FIGS. 2A and 2B are views showing a sheet after image formation is made by an image forming apparatus;

FIG. 3 is a view showing examples of information stored in a data server;

FIG. 7 is a plan view showing the first suppression unit along with sheets;

FIG. 8 is a perspective view showing the first suppression unit and a second suppression unit along with a belt member;

FIG. 10 is a flowchart showing the operation of the reader/writer apparatus;

FIGS. 12A and 12B are views for explaining a comparative example of reading processing and writing processing;

FIGS. 15A to 15C are views showing the processing when a reader/writer section fails;

DETAILED DESCRIPTION

Figure 4:
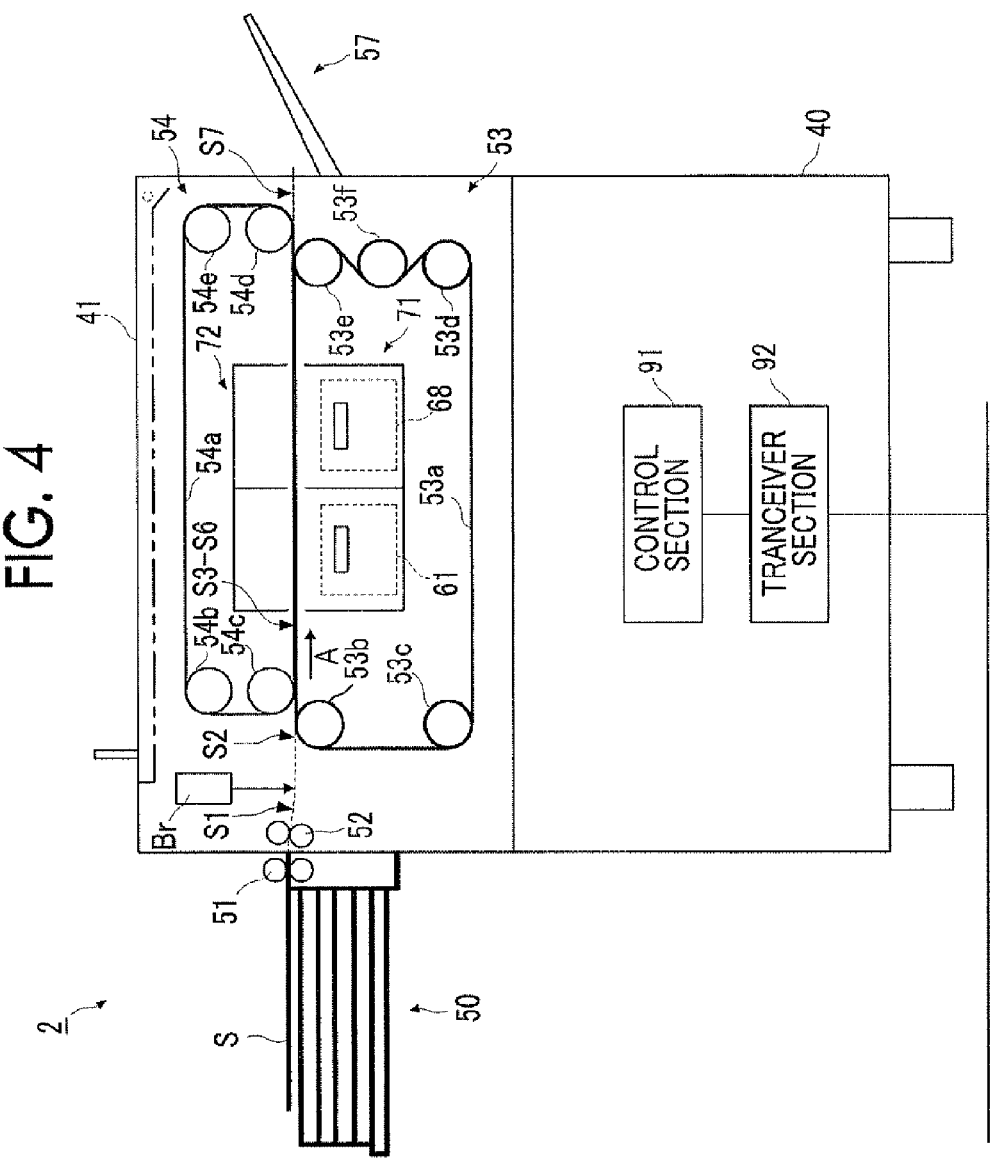
FIG. 4 is a view for explaining a reader/writer apparatus.

Hereinafter, an exemplary embodiment of the invention will be described with reference to the accompanying drawings.

FIG. 1 is a schematic configuration view showing a processing system in the present exemplary embodiment.

As shown in this drawing, this system is provided with an image forming apparatus 1 that forms an image on a sheet S in which plural wireless tags T (hereinafter referred to as "tags T") are embedded, a reader/writer apparatus 2 that writes information in the tags T embedded in the sheet S or reads information from the tags T, and a data server 3 that stores the information written in the tags T and the information read from the tags T. Additionally, this system is provided with a controller 4 that has a display panel 4a that displays information, and receives age formation conditions in the image forming apparatus 1, various conditions in the reader/writer apparatus 2, the information written in the tags T, and the like. In addition, the controller 4 in the present exemplary embodiment is constituted by a personal computer (PC).

In this system, first, an image is formed on the surface of a sheet S delivered from a factory or the like by the image forming apparatus 1. Next, the reader/writer apparatus 2 as an example of a wireless tag processor reads unique identification information (also referred to as identification number or a unique number (UID)) (hereinafter referred to as "identification information" in the present specification) that each tag T has, from each of the plural tags T embedded on the sheet S, and writes information to each tag T. Thereafter, the sheet S is delivered to a user or the like. In addition, as for the configuration of this system, the image forming apparatus 1 and the reader/writer apparatus 2 are separate apparatuses, but may be integrally formed.

FIGS. 2A and 2B show the sheet S after image formation is made by the image forming apparatus 1.

As shown in FIG. 2A, a sheet S as an example of a medium is constituted by a base body B formed in a rectangular shape, and plural labels L1 to L8 (hereinafter referred to as "labels L") that are provided so as to be detachable from the base body B. An adhesive is applied to the back of each of the plural labels L1 to L8, and individual labels L is detached from the base body B, and is attached to, for example, a book (books), a DVD (Digital Versatile Disc), or a CD (Compact Disc). Additionally, the individual labels L in the present exemplary embodiment are arranged in four rows in the longitudinal direction of the sheet S and in two rows in the lateral direction of the sheet S. Additionally, the individual labels L are arranged in the shape of a grid in 4 rows×2 columns.

In addition, in the present exemplary embodiment, the sheet S is transported along the lateral direction thereof in the image forming apparatus 1 and the reader/writer apparatus 2. Additionally, the sheet S, which is formed in a rectangular shape and has a long side and a short side, is transported in a state where the long side becomes a leading edge. In this case, compared to a form in which the sheet S is transported with the short side as a leading edge, the number of sheets S that may be transported per unit time may be increased. Here, to describe the labels L in relation to the transporting direction of the sheet S, in the sheet S in the present exemplary embodiment, four labels L5 to L8 are provided downstream in the sheet transporting direction and four labels L1 to L4 are provided upstream in the sheet transporting direction.

Additionally, in the present exemplary embodiment, tags T1 to T8 are embedded in the labels L, respectively. To describe a label L1 as an example, as shown in FIG. 2B, a tag T1 is embedded in the label L1. In addition, the tag T1 in the present exemplary embodiment includes an antenna coil Ta, a capacitor for constituting a resonant circuit, and an IC chip Tc for storing information, as fundamental circuit elements. In addition, the capacitor may be incorporated into the antenna coil Ta, and may be built in the IC chip Tc.

In addition, tags that are used as previously may be used as the tags T, and are not particularly limited. In addition, otherwise, the tags T may be referred to as RFID tags, IC tags, non-contact data carriers, wireless IC tags, non-contact ICs, non-contact IC labels, non-contact IC tags, or the like. Additionally, as the tags T in the present exemplary embodiment, so-called passive tags that do not have a cell and develop electricity by radio waves from reader/writer sections that will be described later are used. It is noted that the tags are not limited to the passive tags, and so-called active tags equipped with a cell may also be used.

Here, when formation of an image in the image forming apparatus 1 is completed, a state shown in FIG. 2A is entered. In addition, in the present exemplary embodiment, a case where the labels L are attached to books to be lent out in a library will be described as an example. When formation of an image in the image forming apparatus 1 is completed, for example, those showing a library name that becomes the collection location of a book, a bar code, and bar code information are printed using numerals on the surface of individual labels L. Additionally, a sheet identification bar code BK for identifying a sheet S from other sheets is printed at one side portion in the lateral direction of the sheet S. In addition, the application of the tags T is not limited to the library only. For example, the tags may be attached to rental DVDs, rental videos, or the like in rental shops. Additionally, in various factories, various stores, or the like the tags may be used for production management, stock management, or the like.

Here, the image forming apparatus 1 performs image formation on the surface of a sheet 5, on the basis of information stored in the data server 3. Here, FIG. 3 shows examples of the information stored in the data server 3. As shown in this drawing, for example, a library name 34 used as a collection location of books, bar code information 35, a book title 36, a publishing company 37, an author 38, and the like are stored in a mutually associated state in the data server 3. Moreover, when an image is formed in the image forming apparatus 1, positional information (X, Y) 33 showing the forming position of each image is stored in the data server 3. In addition, individual pieces of positional information 33 are also associated with the library name 34, the bar code information 35, the book title 36, the publishing company 37, the author 38, and the like. Additionally, identification information read from individual tags T in the reader/writer apparatus 2 is stored in the data server 3 (refer to reference numeral 32). In addition, this identification information is also stored so as to be associated with the library name 34, the bar code information 35, and the like.

Here, the positional relationship between individual positions specified by the positional information 33 corresponds to (coincide with) the positional relationship between the individual labels L (individual tags T) arranged at the sheet S. Specifically, positional information (X1, Y1) corresponds to a label L1, positional information (X1, Y2) corresponds to a label L2, positional information (X1, Y3) corresponds to a label L3, and positional information (X1, Y4) corresponds to a label L4. Moreover, positional information (X2, Y1) corresponds to a label L5, positional information (X2, Y2) corresponds to label L6, positional information (X2, Y3) corresponds to label L7, and positional information (X2, Y4) corresponds to a label L8.

For example, when the positional information 33 is (X1, Y1), the image forming apparatus 1 performs image formation on the label L1, and for example, when the positional information 33 is (X2, Y3), the image forming apparatus 1 performs image formation on the label L7. In addition, this positional information 33 may be automatically allocated by the data server 3, for example, when information on the library name 34 or the like is stored in the data server 3. Additionally, the positional information may be allocated by the controller 4.

Additionally, sheet identification numbers for identifying a sheet S from other sheets S are stored in the data server 3 (refer to reference numeral 31). In the present exemplary embodiment, one sheet identification number is generated for eight pieces of information so as to correspond to the number (8) of labels L provided at one sheet S. In addition, this sheet identification number may be automatically allocated by the data server 3, for example, when the library name 34 or the like is stored in the data server 3. Additionally, the sheet identification number may be allocated by the controller 4.

Here, the operation of the image forming apparatus 1 will be described.

When image formation is performed on a sheet S, the image forming apparatus 1 acquires one sheet's worth of information from the data server 3. Next, an image to be formed on the sheet S is generated on the basis of this information. More specifically, first, the image forming apparatus 1 generates a bar code on the basis of the bar code information 35, generates an image in which the bar code, the bar code information 35 visualized as a number, and the library name as a character string are arranged in a preset relation, and arranges this image at a position corresponding to the positional information 33. Then, the image forming apparatus 1 performs this processing for eight cases, and generates an overall image. Additionally, the image forming apparatus 1 generates a sheet identification bar code BK on the basis of the sheet identification number 31, and generates an image obtained by combining the sheet identification bar code BK with the overall image.

Then, the image forming apparatus 1 forms the combined image on a sheet S positioned in a preset place. As a result, for example, a character string "AA library" is printed on the label L1 of the sheet S. Additionally, as shown in FIG. 2A, a "bar code" and bar code information "123456789-1" visualized as a number are printed on the label L1. Additionally, the sheet identification bar code BK in which a sheet identification number "200707010001" (refer to FIG. 3) is bar-coded is printed at the right end (one end in the sheet transporting direction) of the sheet S (refer to FIG. 2A).

In addition, the image forming apparatus 1 in the present exemplary embodiment adopts a so-called electrophotographic system, and forms electrostatic latent images based on image data for individual colors, for example, on photoreceptor drums provided corresponding to the individual colors, using exposure devices which are not shown. Thereafter, the image forming apparatus develops the electrostatic latent images, using individual color toners, and transfers toner images formed by this development onto a sheet S. Then, the toner images are fixed on the sheet S. Thereby, the sheet S on which information is printed is generated. In addition, a so-called ink jet system, a system using thermal paper, or the like may also be adopted in the image forming apparatus 1.

Next, in the present exemplary embodiment, identification information is read from the individual tags T in the reader/writer apparatus 2. Additionally, information on the library name 34, the bar code information 35, the book title 36, the publishing company 37, and the author 38 is written in the individual tags T. In addition, in the present specification, the information written in the individual tags T is referred to as "detailed information" hereinbelow.

Figure 5:
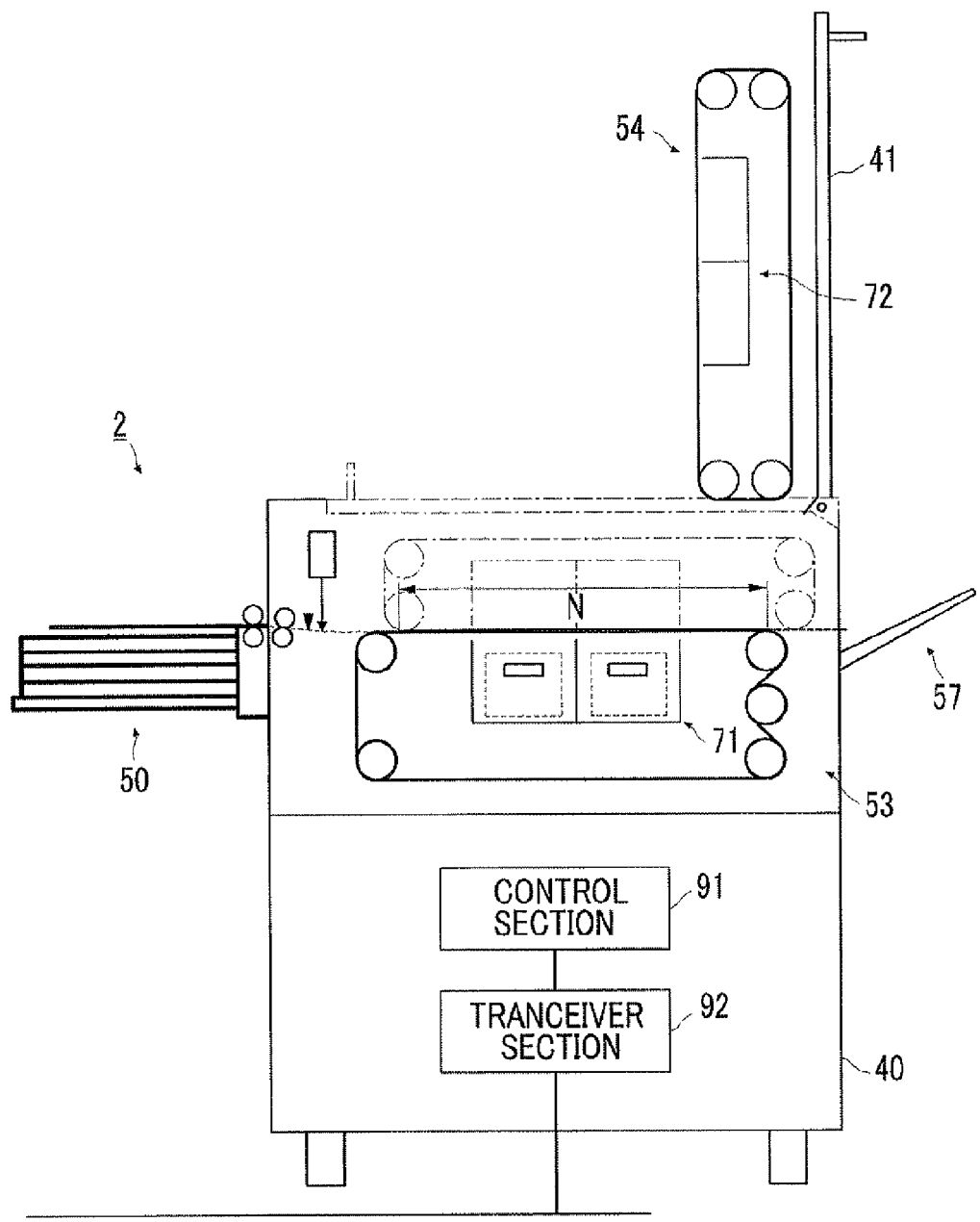
FIG. 5 is a view for explaining the reader/writer apparatus.

FIGS. 4 and 5 are views for explaining the reader/writer apparatus 2.

As shown in FIG. 4, the reader/writer apparatus 2 in the present exemplary embodiment includes an apparatus body portion 40, and an opening and closing plate 41 that is provided at an upper part of the apparatus body portion 40 and is openably and closably attached to the apparatus body portion 40. Additionally, the reader/writer apparatus 2 is provided with a stacking part 50 on which plural sheets S are stacked, and a pair of delivery rolls 51 that feeds out the sheets S one by one toward the inside of the apparatus body portion 40 from the stacked plural sheets S stacked on the stacking part 50.

Additionally, the reader/writer apparatus 2 includes a pair of feed rolls 52 that further transports a sheet S fed-out by the delivery rolls 51 toward the downstream in the transporting direction, a first belt unit 53 and a second belt unit 54 that further transport the sheet S transported from the feed rolls 52 toward the downstream in the transporting direction, and an accommodating part 57 that stacks and accommodates the sheets S transported by the first belt unit 53 and the second belt unit 54. Moreover, the reader/writer apparatus 2 in the present exemplary embodiment has plural reader/writer sections 61 to 68 (only 61 and 68 are shown in the drawing) that read information from the tags T embedded in the sheet S, and writes information in the tags T.

Additionally, the reader/writer apparatus 2 includes a first suppression unit 71 and a second suppression unit 72 that suppress interference of radio waves transmitted from the reader/writer sections 61 to 68. Moreover, the reader/writer apparatus 2 is provided with a first sensor S1, a second sensor S2, third to sixth sensors S3 to S6, and a seventh sensor S7 that are provided along the transporting path of the sheet S, and performs predetermined output when the sheet S passes.

Here, the first sensor S1 is arranged closer to the downstream in the sheet transporting direction than the feed rolls 52, and is arranged closer to the upstream in the sheet transporting direction than the reading position by a bar code reader Br that will be described below. Additionally, the second sensor S2 is arranged closer to the downstream in the sheet transporting direction than the reading position by the code reader Br, and is arranged closer to the upstream in the sheet transporting direction than the second belt unit 54. The third to sixth sensors S3 to S6 is arranged closer to the downstream in the sheet transporting direction than the second sensor S2, and is arranged closer to the upstream in the sheet transporting direction than the seventh sensor S7. The seventh sensor S7 is arranged closer to the downstream in the sheet transporting direction than a nip portion N that will be described below.

Moreover, a bar code reader Br that reads the sheet identification bar code BK formed on the sheet S is provided closer to the downstream in the sheet transporting direction than a detection region by the first sensor S1 in the reader/writer apparatus 2. Additionally, the reader/writer apparatus 2 includes a control section 91 that controls the respective sections (the respective apparatuses), and a transceiver section 92 that exchanges information among the data server 3, the controller 4, and the like.

Here, the first belt unit 53 that functions as a portion of transporting unit includes a belt member 53a that is formed in an endless shape, first to fourth stretching rolls 53b, 53c, 53d, and 53e that stretch the belt member 53a from the inside, and a tension roll 53f that presses the belt member 53a from the outside and imparts tension to the belt member 53a. In the present exemplary embodiment, the first to fourth stretching rolls 53b, 53c, 53d, and 53e are arranged in a mutually separated state, and these four stretching rolls are provided so as to be arranged at individual apexes in a rectangle shape (oblong shape).

More specifically, the first stretching roll 53b is arranged on the upstream in the sheet transporting direction and on the sheet transporting path side, and the second stretching roll 53c is arranged on the upstream in the sheet transporting direction, and on a side separated from the sheet transporting path. Additionally, the third stretching roll 53d is arranged on the downstream in the sheet transporting direction and on the side separated from the sheet transporting path, and the fourth stretching roll 53e is arranged on the downstream in the sheet transporting direction and on the sheet transporting path side. In the present exemplary embodiment, as a result of arranging the individual stretching rolls 53b, 53c, 53d, and 53e in this way, the space where the first suppression unit 71 is accommodated is formed inside the belt member 53a.

The second belt unit 54 is arranged above the first belt unit 53 (facing position). Additionally, the second belt unit 54 is arranged so as to be pressed against the first belt unit 53, and forms a nip portion N (refer to FIG. 5) where a sheet S is transported while being pinched between the first belt unit 53 and the second belt unit 54 from above and below. Here, the second belt unit 54 includes a belt member 54a that is formed in an endless shape, and first to fourth stretching rolls 54b, 54c, 54d, and 54e that stretch the belt member 54a from the inside. In addition, the belt member 54a and the above belt member 53a in the present exemplary embodiment are formed from a material (for example, a rubber member) that does not shield radio waves transmitted from antennas 61a to 68a that will be described below.

Also in the second belt unit 54, the first to fourth stretching rolls 54b, 54c, 54d, and 54e are arranged in a mutually separated state, and these four stretching rolls are provided so as to be arranged at individual apexes in a rectangle shape (oblong shape). For this reason, also in the second belt unit 54, the space where the second suppression unit 72 is accommodated is formed inside the belt member 54a. Additionally, the nip portion N is formed as a flat portion in the belt member 53a and a flat portion in the belt member 54a come into contact with each other. For this reason, the transporting path in the nip portion N becomes flat.

Moreover, as shown in FIG. 5, the second belt unit 54 and the second suppression unit 72 are movably provided so as to separate from the first belt unit 53 and the first suppression unit 71, in conjunction with (accompanied with) the opening and closing of the opening and closing plate 41. For this reason, the opening of the sheet transporting path is allowed, and when jamming or the like of a sheet S occurs in the sheet transporting path, the jammed sheet S may be simply and easily removed.

Here, the first suppression unit 71 will be described with reference to FIGS. 6 and 7. In addition, FIG. 6 is a perspective view showing the first suppression unit 71 along with a sheet S, and FIG. 7 is a plan view showing the first suppression unit 71 with the sheet S.

Figure 6:
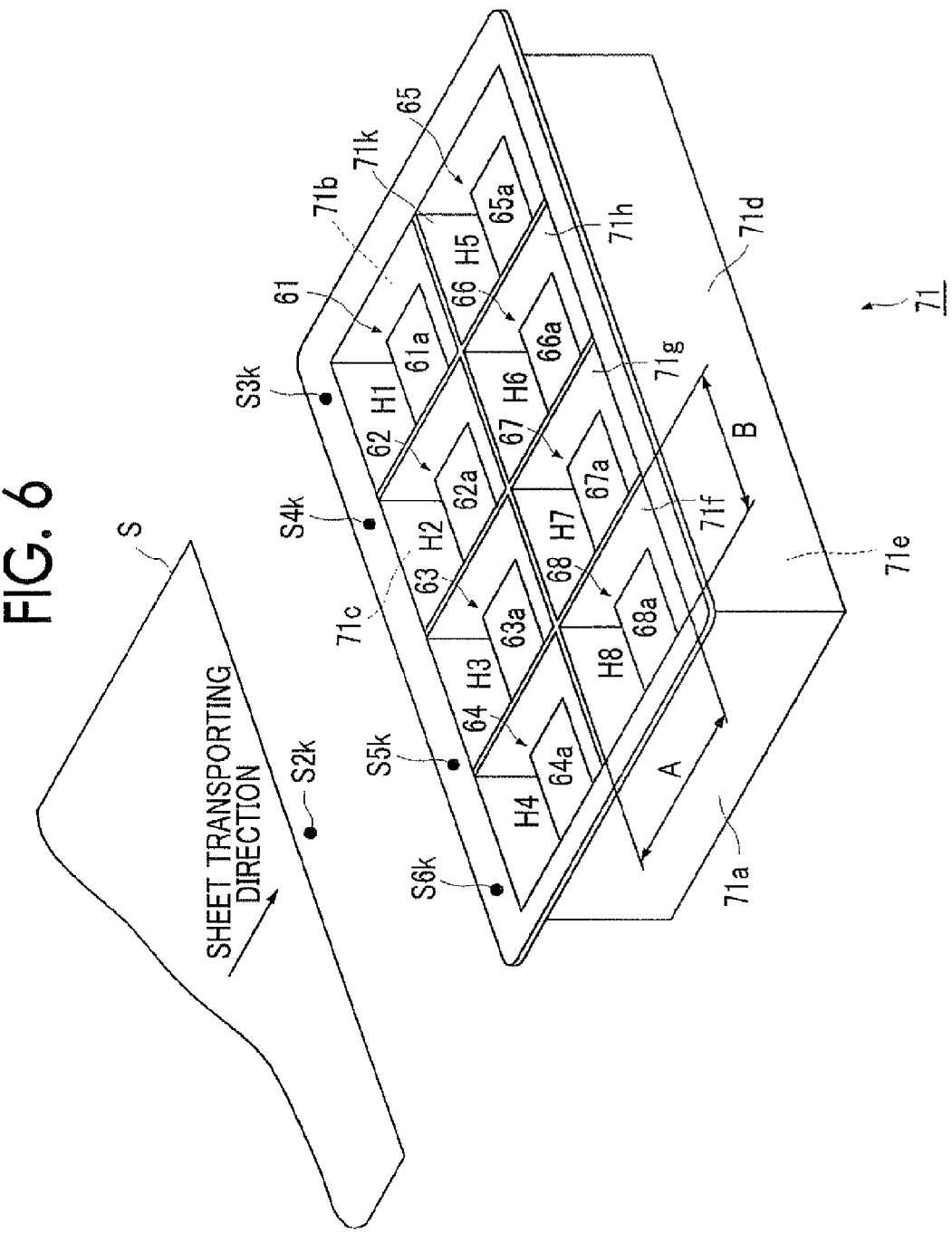
FIG. 6 is a perspective view showing a first suppression unit along with sheets.

As shown in FIG. 6, the first suppression unit 71 in the present exemplary embodiment includes an opening on a side where the sheet S is transported, and is formed in the shape of a box (a rectangular parallelepiped). Additionally, the first suppression unit 71 is arranged on one side of the transporting path of the sheet S. Moreover, the first suppression unit 71 includes a first side wall 71a formed along the transporting direction of the sheet S, a second side wall 71b arranged at the facing position of this first side wall 71a, a third side wall 71c formed in a direction orthogonal to the transporting direction of the sheet S, and a fourth side wall 71d formed similarly in the direction orthogonal to the transporting direction of the sheet S, and a bottom portion 71e.

Moreover, the first suppression unit 71 includes a first partition member 71k that partitions an internal space into two in the sheet transporting direction, and a second partition member 71f, a third partition member 71g, and a fourth partition member 71h that partition the internal space into four in a direction orthogonal to the sheet transporting direction. As a result, the first suppression unit 71 in the present exemplary embodiment is brought into a state where closed spaces H1 to H8 closed except for the opening provided on the transporting path side of the sheet S are provided in the shape of a grid.

In addition, the closed spaces H1 to H8 in the present exemplary embodiment are respectively arranged so as to face the individual tags T provided on the sheet S, when a transported sheet S is arranged (stopped) at a facing position of the first suppression unit 71. Additionally, in the present exemplary embodiment, the reader/writer sections 61 to 68 that write information in the tags T or read information from the tags T are provided in the closed spaces H1 to H8, respectively.

Here, those that are used as previously may be used for the reader/writer sections 61 to 68 as an example of a radio wave transmitting unit, and the reader/writer sections are not particularly limited. The individual reader/writer sections 61 to 68 in the present exemplary embodiment include antennas 61a to 68a as an example of transmitting parts, a demodulation circuit (not shown) that demodulates signals received in the antennas, a modulation circuit that modulates information to be transmitted and outputs the information to the antennas, and a control part that controls the demodulation circuit and the modulation circuit.

In addition, the antennas 61a to 68a in the present exemplary embodiment are provided so as to correspond to (coincide with) the arrangement relationship of the individual tags T embedded in the sheet S, and an arrangement aspect becomes grid-like. Additionally, the antennas 61a to 68a in the present exemplary embodiment are respectively arranged in relation corresponding to (coinciding with) the positional (arrangement) relation of individual positions specified by the positional information 33. More specifically, the present exemplary embodiment is configured such that an antenna group (an example of a transmitting part group) is formed as four antennas that are arranged along one direction orthogonal to the transporting direction of the sheet 5, and plural rows (two rows in the present exemplary embodiment) of antenna groups that are provided in a direction (a direction orthogonal to the one direction or the transporting direction of the sheet S) crossing the one direction.

Moreover, the antennas 61a to 68a in the present exemplary embodiment are respectively arranged such that information may be written in the individual tags T1 to T8 in parallel (simultaneously) and such that information may be read from the individual tags T1 to T8 in parallel (simultaneously). In addition, the expression "in parallel (simultaneously)" is used in order to describe the arrangement aspect of the antennas 61a to 68a, and actual writing and reading may be performed in aspects other than "in parallel", for example, by operating the antennas 61a to 68a non-simultaneously to perform writing of information in the individual tags T.

Additionally, in the present exemplary embodiment, the information read by the reader/writer section 61 is set so as to be associated with detailed information associated with the positional information (X1, Y1) and be stored in the data server 3. Additionally, the information read by the reader/writer section 62 is associated with detailed information associated with the positional information (X1, Y2), and is stored in the data server 3. Similarly, the information read by the reader/writer section 63 is associated with detailed information associated with the positional information (X1, Y3) and is stored in the data server 3, and the information read by the reader/writer section 64 is associated with detailed information associated with the positional information (X1, Y4) and is stored in the data server 3.

Additionally, the information read by the reader/writer section 65 is associated with detailed information associated with the positional information (X2, Y1) and is stored in the data server 3, and the information read by the reader/writer section 66 is associated with detailed information associated with the positional information (X2, Y2) and is stored in the data server 3. Additionally, the information read by the reader/writer section 67 is associated with detailed information associated with the positional information (X2, Y3) and is stored in the data server 3, and the information read by the reader/writer section 68 is associated with detailed information associated with the positional information (X2, Y4) and is stored in the data server 3.

More specifically, for example, when identification information is read from the tags T by the reader/writer section 61, the read identification information is associated with the detailed information associated with the positional information (X1, Y1) and is stored in the data server 3. Additionally, for example, when identification information is read from the tags T by the reader/writer section 67, the read identification information is associated with the detailed information associated with the positional information (X2, Y3) and is stored in the data server 3.

Moreover, in the present exemplary embodiment, the detailed information associated with the positional information (X1, Y1) is set so as to be output to the reader/writer section 61, and the detailed information associated with the positional information (X1, Y2) is set so as to be output to the reader/writer section 62. Additionally, the detailed information associated with the positional information (X1, Y3) is output to the reader/writer section 63, and the detailed information associated with the positional information (X1, Y4) is output to the reader/writer section 64. Additionally, the detailed information associated with the positional information (X2, Y1) is output to the reader/writer section 65, and the detailed information associated with the positional information (X2, Y2) is output to the reader/writer section 66. Moreover, the detailed information associated with the positional information (X2, Y3) is output to the reader/writer section 67, and the detailed information associated with the positional information (X2, Y4) is output to the reader/writer section 68.

For this reason, for example, detailed information (refer to FIG. 3), such as the library name 34, the bar code information 35, the book title 36, and the like that are associated with the positional information (X1, Y1) is output to the reader/writer section 61, and for example, detailed information, such as the library name 34, the bar code information 35, the book title 36, and the like that are associated with positional information (X2, Y3) are output to the reader/writer section 67.

Here, materials used for the first suppression unit 71 and the second suppression unit 72 include stainless steel, brass, aluminum, copper, gold, and the like. Additionally, the first suppression unit 71 and the second suppression unit 72 may be provided by forming a principal part from a resin material, and attaching a material formed in the shape of a plate or a foil to the surface or the like of the principal part. In such a configuration, the first suppression unit 71 and the second suppression unit 72 become lighter.

Additionally, in the present exemplary embodiment, the shape of each of the closed spaces H1 to H8 in plan view becomes a rectangular shape. In other words, the shape of each of the closed spaces H1 to H8 in the opening becomes a rectangular shape. More specifically, each of the closed spaces H1 to H8 is formed such that the shape thereof in the opening becomes a shape that extends in the sheet transporting direction. More specifically, each of the closed spaces H1 to H8 is formed such that the length A thereof in a direction along the sheet transporting direction is greater than the length B thereof in a direction orthogonal to the sheet transporting direction (refer to FIG. 6).

Although the details will be described below, in the present exemplary embodiment, the sheet S is stopped at the facing position of the first suppression unit 71. In this case, the sheet S may deviate in the sheet transporting direction and may be stopped. By adopting a shape like the present exemplary embodiment, even if the sheet S deviates and is stopped, writing and reading is performed by the reader/writer sections 61 to 68.

In addition, although the example in which the opening is formed in a rectangular shape is described in the present exemplary embodiment, the opening may be formed in a cylindrical shape or an elliptical shape. In addition, when the opening is formed in the elliptical shape, it is desirable to arrange a major axis so as to run along the transporting direction of the sheet S. Moreover, each of the closed spaces H1 to H8 in the present exemplary embodiment may have a rectangular parallelepiped shape, shapes, such as a cup shape, a dome shape, a pyramid, and a triangular pyramid, may be adopted. When these shapes are adopted, as being separated from the opening, the external diameter becomes smaller. Therefore, the apparatus may be miniaturized.

In addition, in FIG. 6, a detection region S2$k$ by the second sensor S2 and detection regions S3$k$ to S6$k$ by the third to sixth sensors S3 to S6 are shown together. The third to sixth sensors S3 to S6 are arranged at predetermined intervals in the direction orthogonal to the sheet transporting direction, and detection results thereof are used to determine whether or not a sheet S is skewed or the like. Additionally, the second sensor S2 is arranged on the upstream side of the first suppression unit 71, and the sheet S is arranged at the facing position of the first suppression unit 71 on the basis of a detection result of the second sensor 52.

Here, for example, as shown in FIG. 7, when a sheet S with A4 size is detected by the second sensor S2 (the detection region is S2$k$), driving of the first belt unit 53 (drive motor that is not shown) is stopped after a predetermined time has elapsed, and the sheet S with the A4 size is arranged at the facing position of the first suppression unit 71. More specifically, the sheet S is arranged such that the individual tags T on the sheet S face the closed spaces H1 to H8, respectively.

FIG. 8 is a perspective view showing the first suppression unit 71 and the second suppression unit 72 along with the belt member 53a. In addition, illustration of the belt member 54a is omitted in this drawing. The second suppression unit 72 is configured similarly to the first suppression unit 71 except that the reader/writer sections 61 to 68 are not provided inside the second suppression unit 72, and the height dimension T (length in the direction orthogonal to the sheet transporting direction) is smaller than the height dimension S in the first suppression unit 71. The second suppression unit 72 configured in this way is arranged so as to face the opening of the first suppression unit 71. Additionally, the second suppression unit 72 is arranged such that the closed spaces H1 to H8 (not shown) of the second suppression unit 72, and the closed spaces H1 to H8 of the first suppression unit 71 face each other.

As a result, in the present exemplary embodiment, the first partition member 71$k$, the second partition member 71$f$, the third partition member 71$g$, and the fourth partition member 71$h$ (refer to FIG. 6) in the first suppression unit 71, and a first partition member 72$k$ (refer to FIG. 9A), a second partition member (not shown), a third partition member (not shown), and a fourth partition member (not shown) in the second suppression unit 72 have a mutually facing relation.

Additionally, as shown in FIG. 8, the belt member 53a (the belt member 54a is also the same) in the present exemplary embodiment is formed such that the width dimension W2 thereof is smaller than the length L of the sheet S in the longitudinal direction, and so as to overlap a portion of the sheet S. By narrowing the width of the belt member 53a in this way, the weight saving and miniaturization of the overall apparatus are achieved. Moreover, the width dimension W2 of the belt member 53a is set to a value such that the belt member 53a may pass between the detection region S4$k$ (refer to FIG. 7) and a detection region S5$k$. This suppresses that detection of the sheet S by the third to sixth sensors S3 to S6 is hindered by the belt member 53a.

Figure 9A:
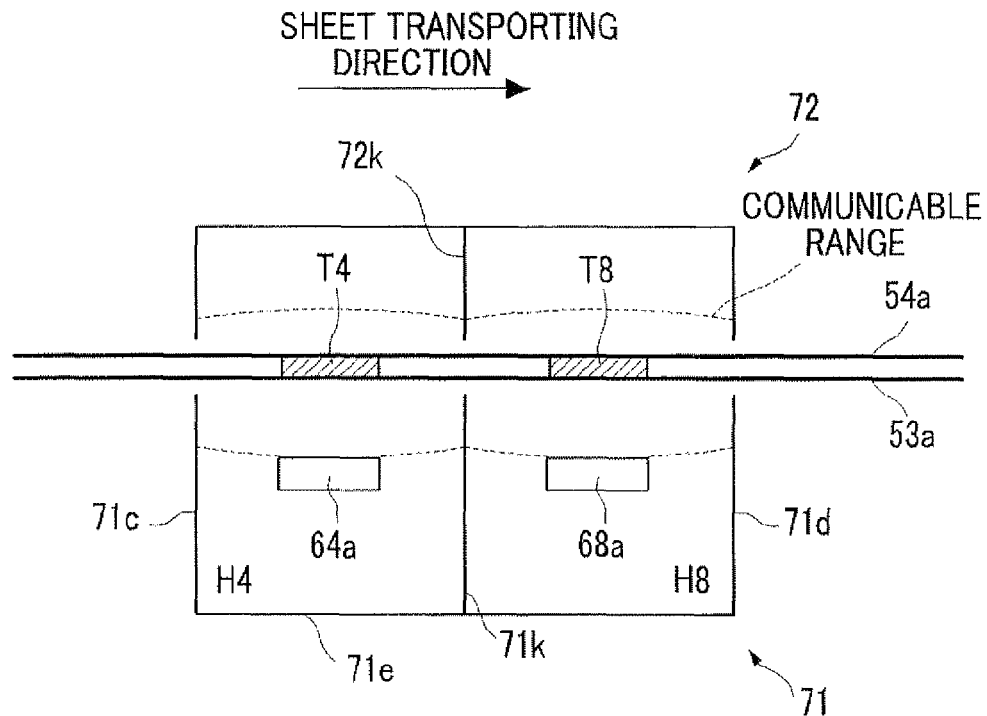
FIGS. 9A and 9B are views showing the first suppression unit or the like in an enlarged manner.
Figure 9B:
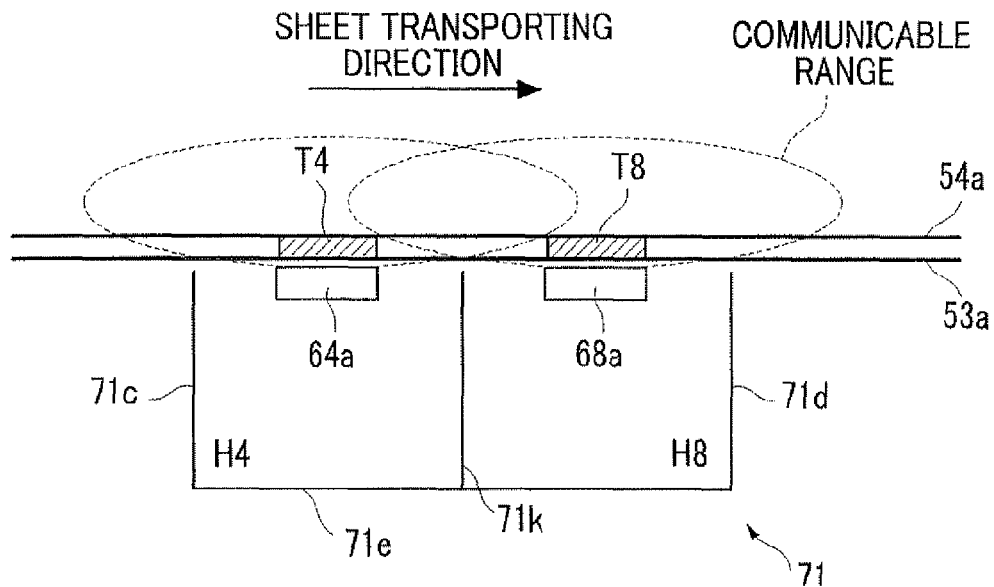

Here, FIGS. 9A and 9B show the first suppression unit 71 or the like in an enlarged manner.

As shown in FIG. 9A, the individual antennas 61a to 68a (the antenna 64a and the antenna 68a are shown in this drawing) in the present exemplary embodiment are brought into a state where the antennas are arranged closer to the bottom portion 71e side than the end (upper end) of the first suppression unit 71 on the opening side. In other words, the individual antennas 61a to 68a are brought into a state where the antennas are arranged inside the individual closed spaces H1 to H8 (the closed spaces H4 and H8 are shown in this drawing). More specifically, the individual antennas 61a to 68a are provided on the side farther from the sheet transporting path than the opening. More specifically, the first partition member 71$k$ that shields radio waves transmitted from the antenna 64a or the like is provided between the antenna 64a and the antenna 68a.

In addition, as shown in FIG. 9B, the individual antennas 61a to 68a may be arranged so as to be aligned at the end in the first suppression unit 71. In this case, however, there is a possibility that radio waves transmitted from the individual antennas 61a to 68a may be apt to interfere with each other, and information may not be read from the tags T1 to T8. Here, as shown in FIG. 9A, when the individual antennas 61a to 68a are arranged closer to the bottom portion 71e side than the end of the first suppression unit 71 on the opening side, the interference of radio waves does not occur easily.

In addition, the interference of radio waves may not occur closer to the first suppression unit 71 side only than the belt members 53a and 54a, but may occur at the facing position of the first suppression unit 71. For this reason, in the present exemplary embodiment, the second suppression unit 72 is provided at the facing position of the first suppression unit 71. This suppresses the interference of radio waves also at the facing position of the first suppression unit 71, and compared to a configuration in which the second suppression unit 72 is not provided, reading and writing of information from the tags T are reliably performed.

Here, the operation of the reader/writer apparatus 2 will be described.

Here, FIG. 10 is a flowchart showing the operation of the reader/writer apparatus 2.

The control section 91 that has detected that a start button (not shown) is pressed first makes a drive motor (not shown) be rotationally driven, thereby making the delivery rolls 51, the feed rolls 52, and the fourth stretching rolls 53e rotationally driven to start transporting of sheets S stacked on a stacking part 50 (Step 101). In addition, the control section 91 is realized by a CPU (Central Processing Unit), a ROM (Read Only Memory) (not shown) in which programs for control and the like are stored, and a RAM (Random Access Memory) (not shown) that is a working memory of the CPU.

Next, when a sheet S is detected by the first sensor S1, the control section 91 makes the bar code reader Br read a sheet identification bar code BK printed on the sheet S, and acquires a sheet identification number (Step 102). Next, the control section 91 recognizes the transporting state of the sheet S, and determines whether or not there is an abnormality in the transporting of the sheet S (Step 103). Specifically, the control section 91 determines whether or not there is an abnormality in the transporting of the sheet S, such as skewing (inclination of the sheet S with respect to the transporting direction), on the basis of detection results by the third to sixth sensors S3 to S6.

When it is determined in Step 103 that there is an abnormality in the transporting, the control section 91 stops the rotational driving of the drive motor, and stops the transporting of the sheet S (Step 111). In addition, the information relating to the stop of the transporting of the sheet S is output to the controller 4, the controller 4 performs error display on a display panel 4a (Step 112), and the processing is ended. In addition, a display panel may be provided at the reader/writer apparatus 2, and the error display may be displayed on this display panel.

On the other hand, when it is not determined in Step 103 that there is abnormality in the transporting, the control section 91 stops the rotational driving of the drive motor, and stops the transporting of the sheet S (Step 104). In addition, this stop processing is executed after a predetermined time has elapsed, after a sheet S is detected by the second sensor S2. As a result, the sheet S is stopped in a predetermined place between the first suppression unit 71 and the second suppression unit 72. Specifically, the sheet S is stopped such that the individual tags T1 to T8 are arranged at the facing positions of the closed spaces H1 to H8, respectively.

Next, the control section 91 reads identification information from the tags T1 to T8 embedded on the individual labels L1 to L8 via the reader/writer sections 61 to 68 (Step 105). Thereafter, the control section 91 outputs individual identification information items read in Step 105 to the data server 3 via the transceiver section 92 (refer to FIG. 4) (Step 106). Thereby, the identification information is stored in the data server 3.

In addition, as described above, for example, when identification information is read from the tags T by the reader/writer section 61, the read identification information is associated with the detailed information associated with the positional information (X1, Y1) and is stored in the data server 3. Additionally, for example, when identification information is read from the tags T by the reader/writer section 67, the read identification information is associated with the detailed information associated with the positional information (X2, Y3) and is stored in the data server 3.

Additionally, when it is not determined that there is an abnormality in the transporting in Step 103, the control section 91 performs the following operation in parallel with the operation of the above Steps 104 to 106. First, the control section 91 transmits the sheet identification number acquired in Step 102 to the data server 3 via the transceiver section 92 (Step 109). Thereby, detailed information for eight cases according to the sheet identification number is transmitted from the data server 3, and this transmitted detailed information is received in the transceiver section 92 (Step 110).

Thereafter, the detailed information for eight cases received in the transceiver section 92 is output to the individual reader/writer sections 61 to 68. Specifically, for example, detailed information, such as the library name 34, the bar code information 35, the book title 36, and the like that are associated with the positional information (X1, Y1) is output to the reader/writer section 61, and for example, detailed information, such as the library name 34, the bar code information 35, the book title 36, and the like that are associated with positional information (X2, Y3) is output to the reader/writer section 67.

Next, the individual reader/writer sections 61 to 68 execute writing of the received detailed information to the individual tags T1 to T8 embedded on the individual labels L1 to L8 (Step 107). Thereafter, the control section 91 resumes the rotation of the drive motor to resume transporting of a sheet S, discharges the sheet S to the outside of the apparatus (Step 108), and ends the processing.

In the present exemplary embodiment, after the processing of Step 108 is completed, a state where detailed information is written in the individual tags T is invited. Additionally, the detailed information, and the identification information on the tags T in which this detailed information is written are associated with each other and stored in the data server 3. For this reason, if the individual labels L are attached to books to be lent out, and information within the data server 3 is transferred to a management terminal in the library or the like, a management system using an RFID may be built. As a result, compared to processing by related-art bar codes or the like, various kinds of processing, such as lending processing, return processing, and the like may be smoothly performed. In addition, although the example in which the information of the data server 3 is transferred to the management terminal is described in the present exemplary embodiment, a configuration in which access is made to the data server 3 from a terminal in a library may also be adopted. Additionally, the data server 3 itself may also be transferred to a library.

Here, reading processing of identification information to be executed in the above Step 105 and writing processing of detailed information to be executed in Step 107 will be described in more detail.

Figure 11A:
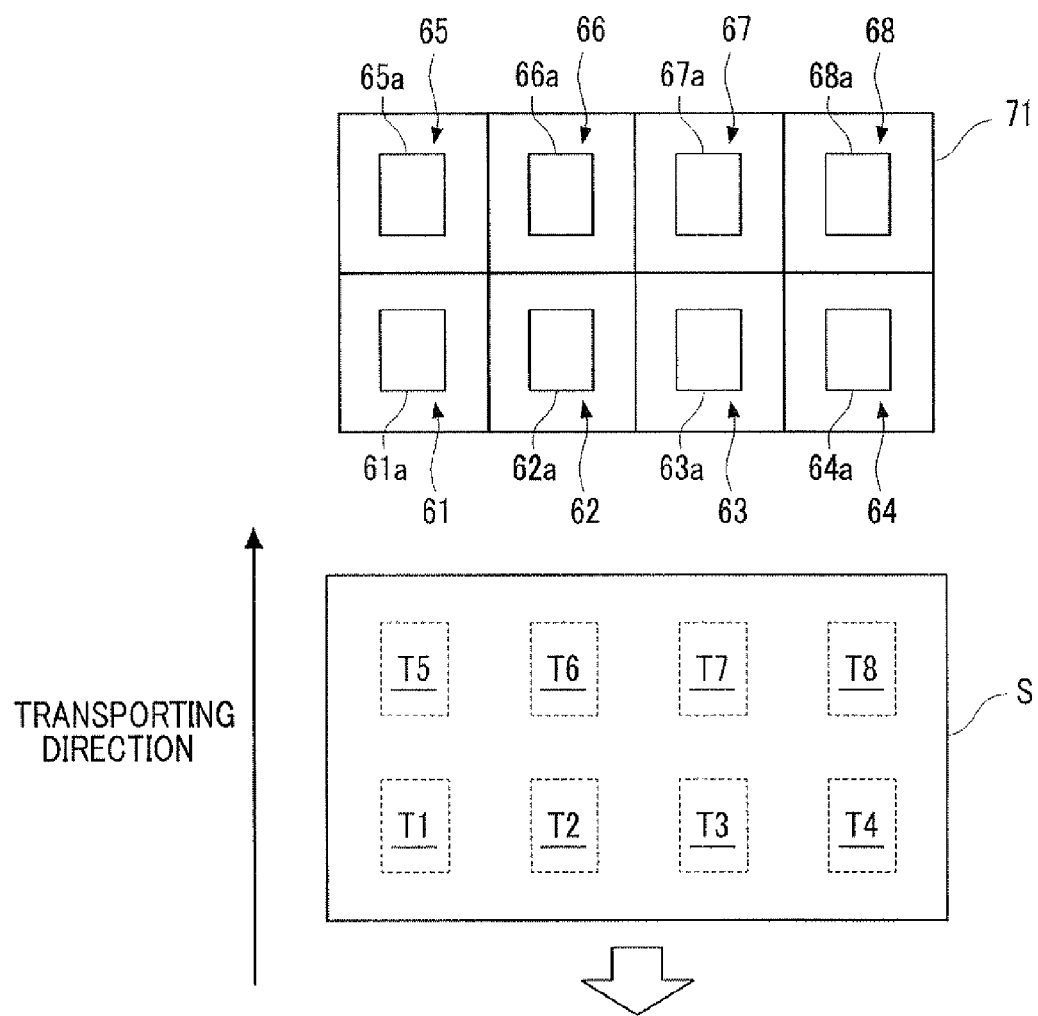
FIGS. 11A to 11C are views for explaining reading processing of identification information, and writing processing of detailed information.
Figure 11B:
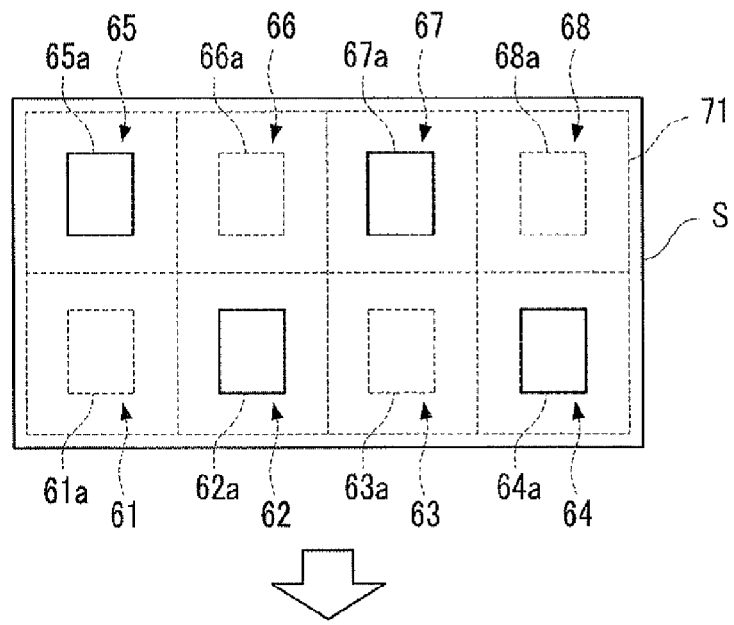
Figure 11C:
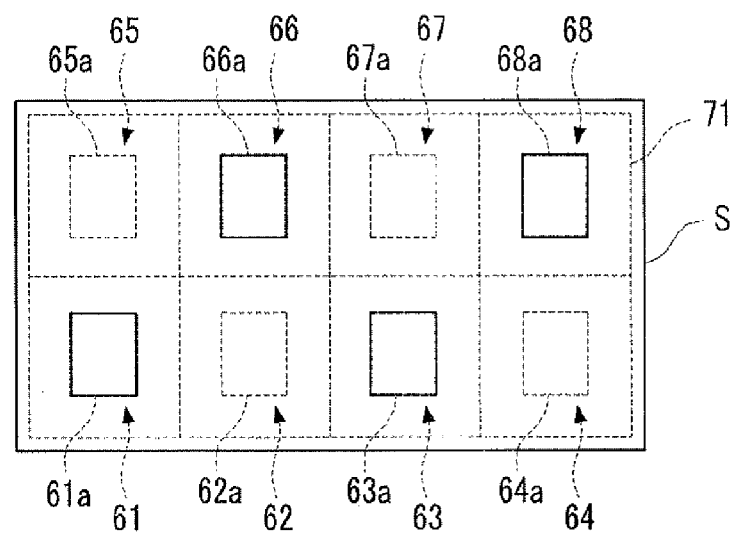

FIGS. 11A to 11C are views for explaining the reading processing of identification information, and the writing processing of detailed information. In the present exemplary embodiment, as described above and as shown in FIG. 11A, a sheet S is transported toward the first suppression unit 71. Thereafter, as shown in FIG. 9B and as described above, transporting of the sheet S is stopped so that the individual tags T1 to T8 provided on the sheet S and the individual reader/writer sections 61 to 68 provided in the first suppression unit 71 face each other. In addition, in FIG. 11B, in order to make the drawing more visible, illustration of the tags T1 to T8 provided on the sheet S is omitted.

Thereafter, in the present exemplary embodiment, as shown by thick broken lines in FIG. 11B, four reader/writer sections 62, 64, 65, and 67 among eight reader/writer sections 61 to 68 that are provided are operated, and identification information is first read from tags T2, T4, T5, and T7. Next, the four reader/writer sections 62, 64, 65, and 67 are operated again, and detailed information is written in the tags T2, T4, T5, and T7.

Additionally, in the present exemplary embodiment, four reader/writer sections 62, 64, 65, and 67 arranged staggered (alternately arranged) among the eight reader/writer sections 61 to 68 that are arranged in the shape of a grid of 4 rows and 2 columns are first operated, identification information is read from four tags T2, T4, T5, and T7 that are arranged staggered, and then, detailed information is written in the four tags T2, T4, T5, and T7. Additionally, in the present exemplary embodiment, the reader/writer sections 62, 64, 65, and 67 are operated so that antennas from which radio waves are transmitted are not adjacent to each other in a direction orthogonal to the transporting direction of the sheet S and so that the antennas from which radio waves are transmitted are not adjacent to each other in the transporting direction of the sheet S.

Thereafter, in the present exemplary embodiment, as shown by thick broken lines in FIG. 11C, four reader/writer sections 61, 63, 66, and 68 that are different in the above four reader/writer sections 62, 64, 65, and 67 are operated, and identification information is read from tags T1, T3, T6, and T8. Next, the reader/writer sections 61, 63, 66, and 68 are operated again, and detailed information is written in the tags T1, T3, T6, and T8. Additionally, even in this case, the four reader/writer sections 61, 63, 66, and 68 that are arranged staggered among the eight reader/writer sections 61 to 68 are operated, and identification information are read from the four individual tags T1, T3, T6, and T8. Next, detailed information is written in the four tags T1, T3, T6, and T8. More specifically, even in this case, the reader/writer sections are operated so that antennas from which radio waves are transmitted are not adjacent to each other in the direction orthogonal to the transporting direction of the sheet S and so that the antennas from which radio waves are transmitted are not adjacent to each other in the transporting direction of the sheet S.

Here, although the first suppression unit 71 or the like is provided in the configuration in the present exemplary embodiment, there is a possibility that, depending on the intensity of radio waves, a gap between the first suppression unit 71 and the second suppression unit 72, or the like, radio waves transmitted from each of the antennas 61*a* to 68*a* may interfere with each other, identification information may not be read from the tags T1 to T8, and detailed information may not be written in the tags T1 to T8. For this reason, in the present exemplary embodiment, the eight reader/writer sections 61 to 68 are not simultaneously operated, but the four reader/writer sections 62, 64, 65, and 67 that are similarly arranged staggered (alternately arranged) are first operated, and then, the four reader/writer sections 61, 63, 66, and 68 that are similarly arranged staggered are operated.

Here, for example, when the eight reader/writer sections 61 to 68 are simultaneously operated to perform reading and writing, radio waves from two reader/writer sections that are adjacent to each other in the column direction or in the row direction, among the eight reader/writer sections 61 to 68 that are arranged in the shape of a grid are apt to interfere with each other. When the reader/writer sections that are arranged staggered are operated as in the present exemplary embodiment, the spacing between the reader/writer sections that transmits radio waves becomes wide, and the interference of radio waves does not easily occur. Additionally, in the configuration in the present exemplary embodiment, as will be described below, the number of transmissions of radio waves is controlled, and decline of productivity is also suppressed.

In addition, only when the eight reader/writer sections 61 to 68 may not be simultaneously operated to perform reading and writing, as described above, the processing of operating the four reader/writer sections that are arranged staggered may also be performed. The interference of radio waves may not occur depending on the output intensity of radio waves or the like, but the eight reader/writer sections 61 to 68 may be simultaneously operated. In such a case, if the processing using the four reader/writer sections uniformly is performed, productivity will be declined. For this reason, as described above, when the eight reader/writer sections 61 to 68 may not be simultaneously operated to perform reading and writing, the processing of operating the four reader/writer sections that is arranged staggered may also be performed. In addition, a technique of determining whether or not reading is performed normally and a technique of determining whether writing is performed normally will be described below.

Additionally, the processing of dividing eight pieces of detailed information written in the individual tags T1 to T8 into two groups on the basis of the magnitude of the amount of information, first operating the four reader/writer sections 62, 64, 65, and 67 to write four pieces of detailed information included in a group with a smaller amount of information in the tags T2, T4, T5, and T7, and then, operating the four reader/writer sections 61, 63, 66, and 68 to write four pieces of information included in a group with a larger amount of information in the tags T1, T3, T6, and T8 may also be performed. Here, in this case, the operating time of the four reader/writer sections 62, 64, 65, and 67 during which writing is performed for the first time may be made short, and the overall productivity is improved.

Additionally, in this case, the operating time of the four reader/writer sections 62, 64, 65, and 67 when the four pieces of information included in a group with a smaller amount of information is written becomes the time required to write detailed information with a fourth smaller amount of information. Here, when detailed information is not divided into two groups as described above, a case where detailed information with a second larger amount of information may be written in the four reader/writer sections 62, 64, 65, and 67 that performs writing for the first time may occur. In this case, the operating time of the reader/writer sections 62, 64, 65, and 67 becomes the time required to write detailed information this larger amount of information, and the operating time of the reader/writer sections 62, 64, 65, and 67 becomes longer compared to a case where the detailed information with the fourth smaller amount of detailed information is written. In this case, overall productivity declines.

In addition, the processing of dividing eight detailed information into two groups is performed by the data server 3, for example. Additionally, although the case where four pieces of detailed information included in a group with a smaller amount of information is written earlier than four pieces of detailed information included in a group with a larger amount of information is illustrated above, the four pieces of detailed information included in the group with a smaller amount of information may also be written later than the four pieces of detailed information included in the group with a larger amount of information.

Additionally, although the case where the reader/writer sections 61 to 68 are arranged in 4 rows and 2 columns is described above, the reader/writer sections may also be arranged, for example, in 2 rows and 4 columns, 2 rows and 2 columns, 4 rows and 4 columns, or the like. Even in such cases, the processing of all the tags T is allowed by operating the reader/writer sections arranged staggered as described above in 2 steps.

FIG. 12A to FIG. 14D are views for explaining a comparative example of reading processing and writing processing.

For example, as shown in FIG. 12A, a configuration in which four reader/writer sections 61 to 64 are provided in parallel in the direction orthogonal to the transporting direction of the sheet S may be adopted. For example, reading processing and writing processing may be performed, for example, by operating the four reader/writer sections 61 to 64 one by one.

To describe specifically, first, a transported sheet S is first stopped such that the reader/writer sections 61 to 64, and tags T5 to T8 of the sheet S face each other. Thereafter, as shown in FIG. 14B, the reader/writer sections 61 to 64 are sequentially operated, and reading processing and writing processing are performed in order on the individual tags T5 to T8. Next, transporting of the sheet S is performed again (refer to reference numeral 14A of FIG. 14B, the transported sheet S is stopped such that the reader/writer sections 61 to 64, and tags T1 to T4 of the sheet S face each other. Thereafter, as shown in FIG. 14B, the reader/writer sections 61 to 64 are sequentially operated, and reading processing and writing processing are performed in order on the individual tags T1 to T4.

In the comparative example shown in FIGS. 12A and 14B, in order to operate the reader/writer sections 61 to 64 one by one, the interference of radio waves is reliably prevented. On the other hand, it will be necessary to operate the reader/writer sections 61 to 64 a total of 8 times (the reading processing are performed 8 times and the writing processing are performed 8 times). Additionally, in this comparative example, transporting of the sheet S is required once as shown using the reference numeral 14A.

Figure 14A:
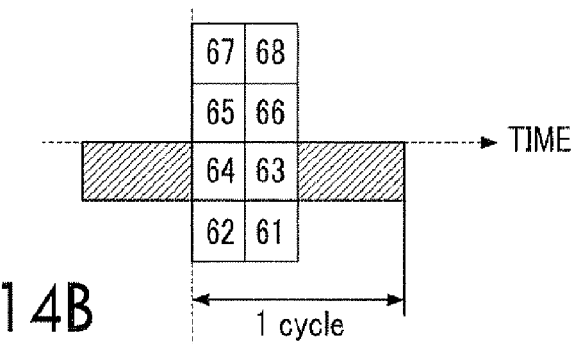
FIGS. 14A to 14D are a view for explaining a comparative example of reading processing and writing processing.
Figure 14B:
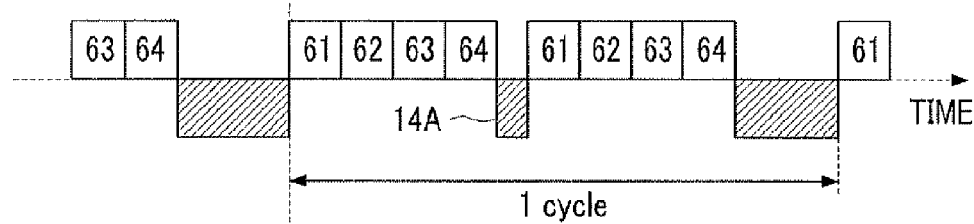

On the other hand, in the processing in the present exemplary embodiment, as shown in FIG. 14A and as described above, the operation of the reader/writer sections 61 to 68 may be needed only 2 times (the reading processing is performed 2 times and the writing processing is performed 2 times). Additionally, in the processing in the present exemplary embodiment, the processing by the reader/writer sections 61, 63, 66, and 68 is performed without transporting the sheet S after the processing by the reader/writer sections 62, 64, 65, and 67 is completed. For this reason, compared to the comparative example shown in FIG. 12A, the reading processing and the writing processing are performed in a short time in the configuration in the present exemplary embodiment. Additionally, in the processing in the present exemplary embodiment, writing processing or the like on the eight tags T of the tags T1 to T8 is performed without performing transporting of a sheet S on the way. For this reason, in the configuration of the present exemplary embodiment, compared to the comparative example, the number of times the transporting system is driven is reduced, and the lifespan of the apparatus is extended.

Figure 14C:
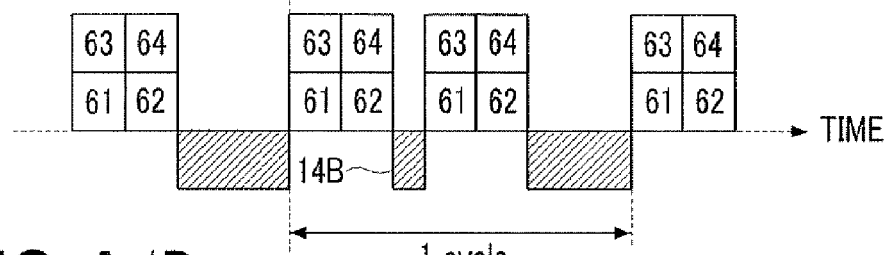

In addition, in the comparative example shown in FIG. 12A, the four reader/writer sections 61 to 64 are operated one by one as above. However, in addition to such an aspect, for example, as shown in FIG. 14C, two reader/writer sections may also be simultaneously operated every other reader/writer section. Specifically, as shown in FIG. 14C, the reader/writer section 61 and the reader/writer section 63 are first operated, and then, the reader/writer section 62 and the reader/writer section 64 are operated. Thereby, reading of identification information from the tags T5 to T8 and writing of the detailed information to the tags T5 to T8 are performed. Next, as shown by reference numeral 14B, transporting of the sheet S is performed.

Thereafter, similarly to the above, the reader/writer section 61 and the reader/writer section 63 are operated, and then, the reader/writer section 62 and the reader/writer section 64 are operated. Thereby, reading of identification information from the tags T1 to T4 and writing of the detailed information to the tags T1 to T4 are performed. In the processing in this comparative example, the number of operations of the reader/writer sections 61 to 64 becomes decreases compared to the comparative example in which the reader/writer sections 61 to 64 are operated one by one. However, compared to the configuration of the present exemplary embodiment, the number of operations of the reader/writer sections 61 to 64 increases.

Another comparative example will now be described.

As shown in FIG. 12B, a configuration in which the eight reader/writer sections 61 to 68 are provided may be adopted. That is, similarly to the present exemplary embodiment, a configuration in which the eight reader/writer sections 61 to 68 are provided may be adopted. Reading processing and writing processing for the tags T1 to T8 may be performed by operating the reader/writer sections 61 to 68 one by one similarly to the comparative example described above. Here, in this comparative example, the eight reader/writer sections 61 to 68 are provided corresponding to the eight tags T1 to T8. Therefore, processing on the eight tags T1 to T8 may be performed without performing transporting of a sheet S. However, it is necessary to operate the reader/writer sections 61 to 64 a total of 8 times (reading is performed 8 times and writing is performed 8 times) similarly to the above.

Additionally, in the comparative example shown in FIG. 12B, similarly to the above, two reader/writer sections may also be simultaneously operated every other reader/writer section. Specifically, the reader/writer section 61 and the reader/writer section 63 are first operated, and then, the reader/writer section 62 and the reader/writer section 64 are operated. Thereby, processing for the tags T1 to T4 is performed. Thereafter, the reader/writer section 65 and the reader/writer section 67 are operated, and then, the reader/writer section 66 and the reader/writer section 68 are operated. Thereby, processing for the tags T5 to T8 is performed. Here, in this comparative example, it is necessary to operate the reader/writer sections 61 to 68 a total of 4 times (the reading is performed 4 times and the writing is performed 4 times).

Another comparative example will be further described.

Figure 13:
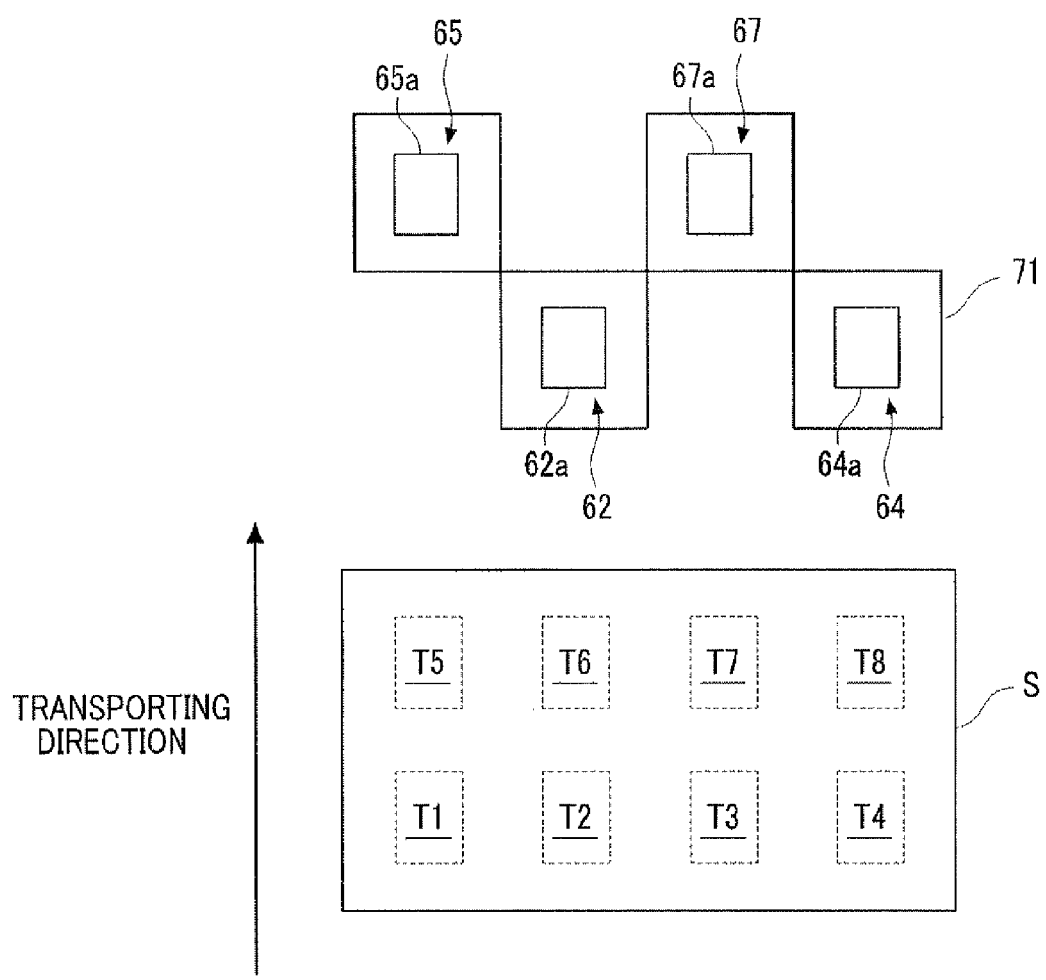
FIG. 13 is a view for explaining a comparative example of reading processing and writing processing.
Figure 14D:
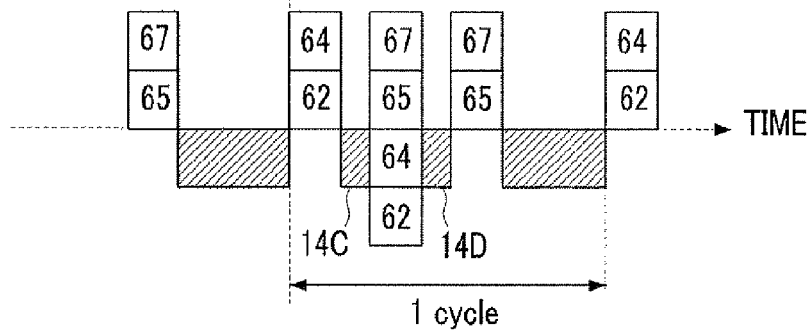

The comparative example shown in FIG. 13 has a configuration in which four reader/writer sections of the eight reader/writer sections 61 to 68 are omitted, and the four reader/writer sections 62, 64, 65, and 67 that are arranged staggered are provided. In this configuration, first, a transported sheet S is stopped such that the tag T6 and the reader/writer section 62 face each other, and the tag T8 and the reader/writer section 64 face each other. Thereafter, as shown in FIG. 14D, the reader/writer section 62 and the reader/writer section 64 are operated. Thereby, processing for the tags T6 and T8 is performed.

Next, as shown by reference numeral 14C of FIG. 14D, transporting of a sheet S is performed, and the sheet S is stopped such that the reader/writer sections 62, 64, 65, and 67, and the tags T2, T4, T5 and T7 face each other. Next, the reader/writer sections 62, 64, 65, and 67 are operated. Thereby, processing for the tags T2, T4, T5, and T7 is performed. Thereafter, as shown by reference numeral 14D, transporting of the sheet S is performed again, and the sheet S is stopped such that the reader/writer sections 65 and 67, and the tags T1 and T3 face each other.

Next, the reader/writer sections 65 and 67 are operated. Thereby, processing for the tags T1 and T3 is performed. Here, in this comparative example, the four reader/writer sections 62, 64, 65, and 67 are arranged staggered. Therefore, the interference of radio waves does not easily occur. However, as shown in FIG. 14D, it is necessary to perform the reading processing and the writing processing 3 times, and to perform transporting of the sheet S two times.

Meanwhile, any of the eight reader/writer sections 61 to 68 provided may fail. In such a case, the following processing is performed in the present exemplary embodiment.

Figure 15A:
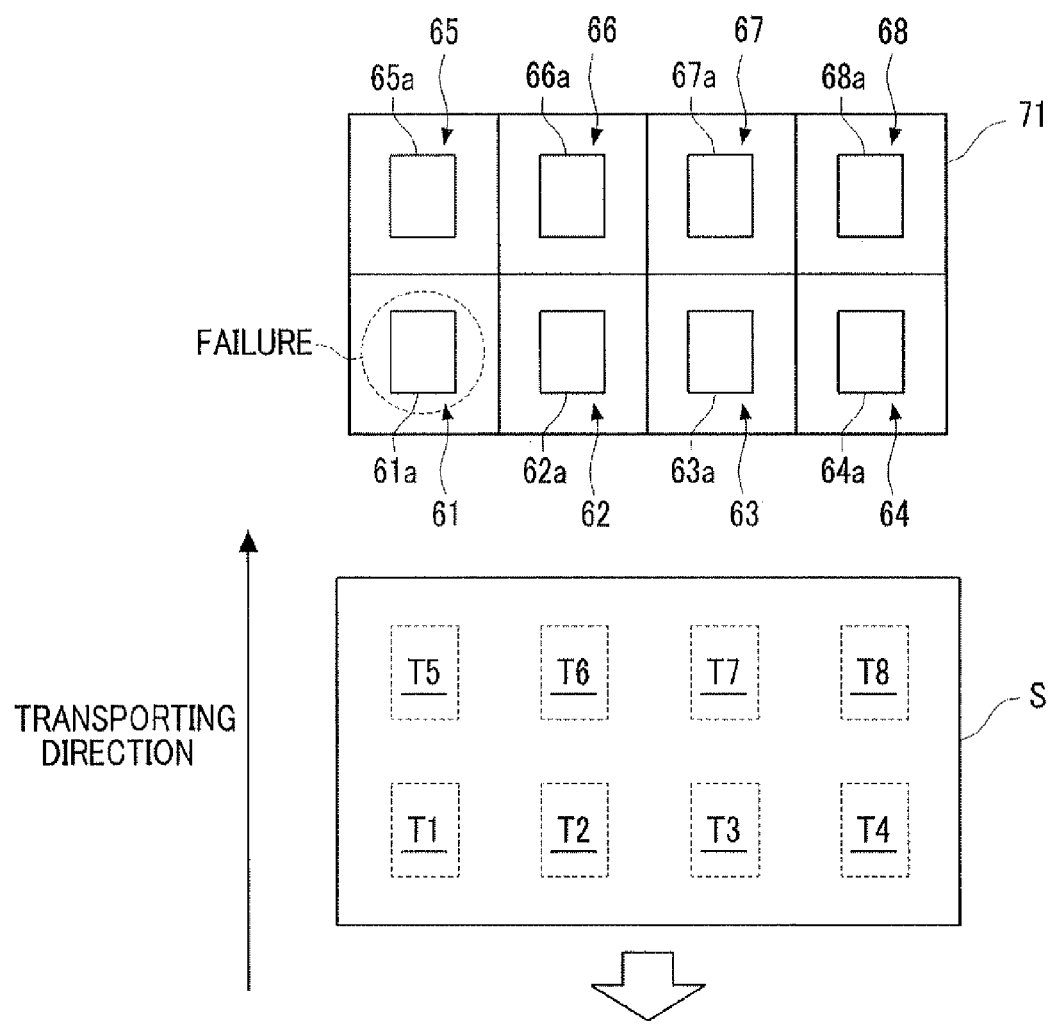
Figure 16A:
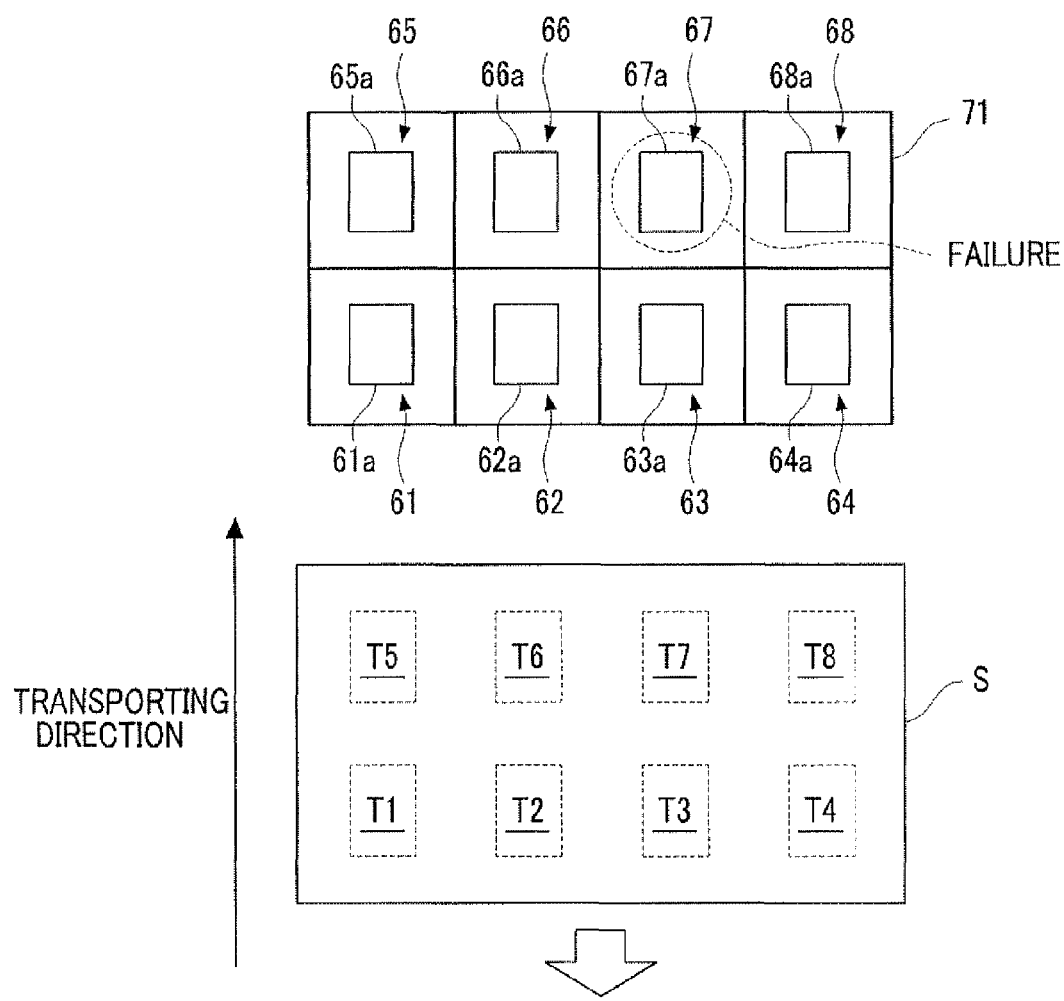
FIGS. 16A to 16C are views showing the processing when a reader/writer section fails.
Figure 16B:
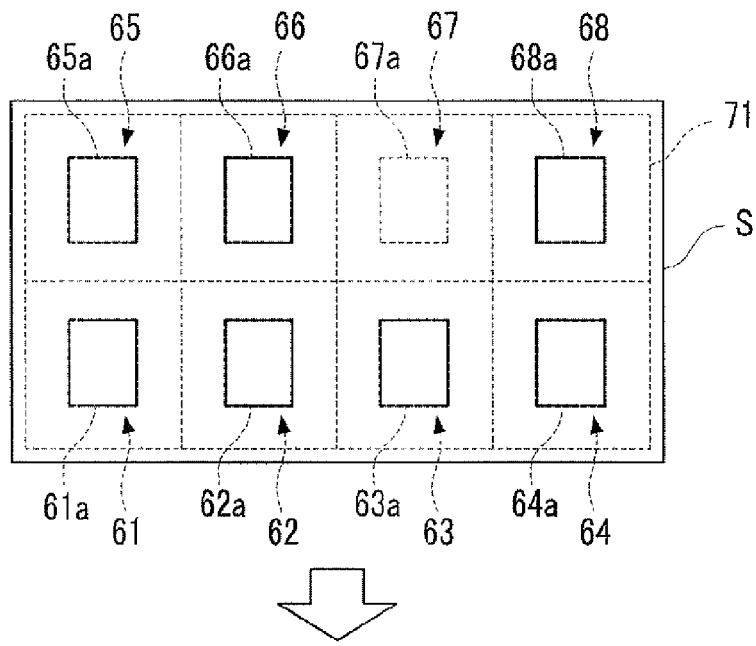
Figure 16C:
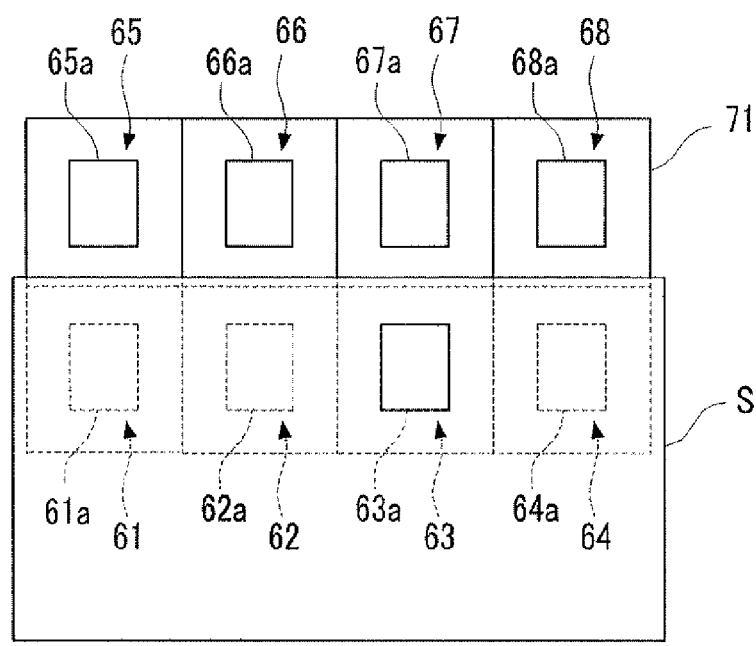

FIG. 15A to FIG. 16C are views showing the processing when a reader/writer section fails. In addition, FIGS. 15A to 15C show the example of processing when the reader/writer section 61 fails, and FIGS. 16A to 16C show an example of processing when the reader/writer section 67 fails.

In the present exemplary embodiment, as described above and as shown in FIG. 15A, a sheet S is transported from the upstream toward the reader/writer sections 61 to 68. Then, as shown in FIG. 15B, transporting of the sheet S is stopped such that the reader/writer sections 61 to 68 and the tags T1 to T8 face each other. Thereafter, the reader/writer sections 62 to 68 excluding the reader/writer section 61 operate (refer to thick broken lines in the drawing). Specifically, four reader/writer sections of the reader/writer sections 62, 64, 65, and 67 operate, and then, three reader/writer sections of the reader/writer sections 63, 66, and 68 operate.

In this example, since the reader/writer section 61 does not operate, processing for the tag T1 may not be performed. In such a case, in the present exemplary embodiment, as shown in FIG. 15C, a sheet S is transported to the downstream, and the tag T1 and the reader/writer section 65 are made to face each other. Next, the reader/writer section 65 operates, and reading processing and writing processing for the tag T1 are performed. As a result, in the present exemplary embodiment, even if the reader/writer section 61 fails, processing for the tag T1 is performed. In addition, when the processing for the tag T1 is performed by the reader/writer section 65 in this way, the identification information read by the reader/writer section 65 is associated with the detailed information associated with the positional information (X1, Y1) (refer to FIG. 3), and is stored in the data server 3. Additionally, the detailed information associated with the positional information (X1, Y1) is output to the reader/writer section 65.

Additionally, as shown in FIG. 16A, when the reader/writer section 67 fails and reading processing and writing processing for the tag T7 may not be performed, as shown in FIGS. 16B and 16C, a sheet S is transported to the upstream and the tag T7 and the reader/writer section 63 are made to face each other. Next, the reader/writer section 63 operates, and reading processing and writing processing for the tag T7 are performed. As a result, even if the reader/writer section 67 fails, processing for the tag T7 is performed. In addition, in this case, the identification information read by the reader/writer section 63 is associated with the detailed information associated with the positional information (X2, Y3) (refer to FIG. 3), and is stored in the data server 3. Additionally, the detailed information associated with the positional information (X2, Y3) is output to the reader/writer section 63.

Figure 17:
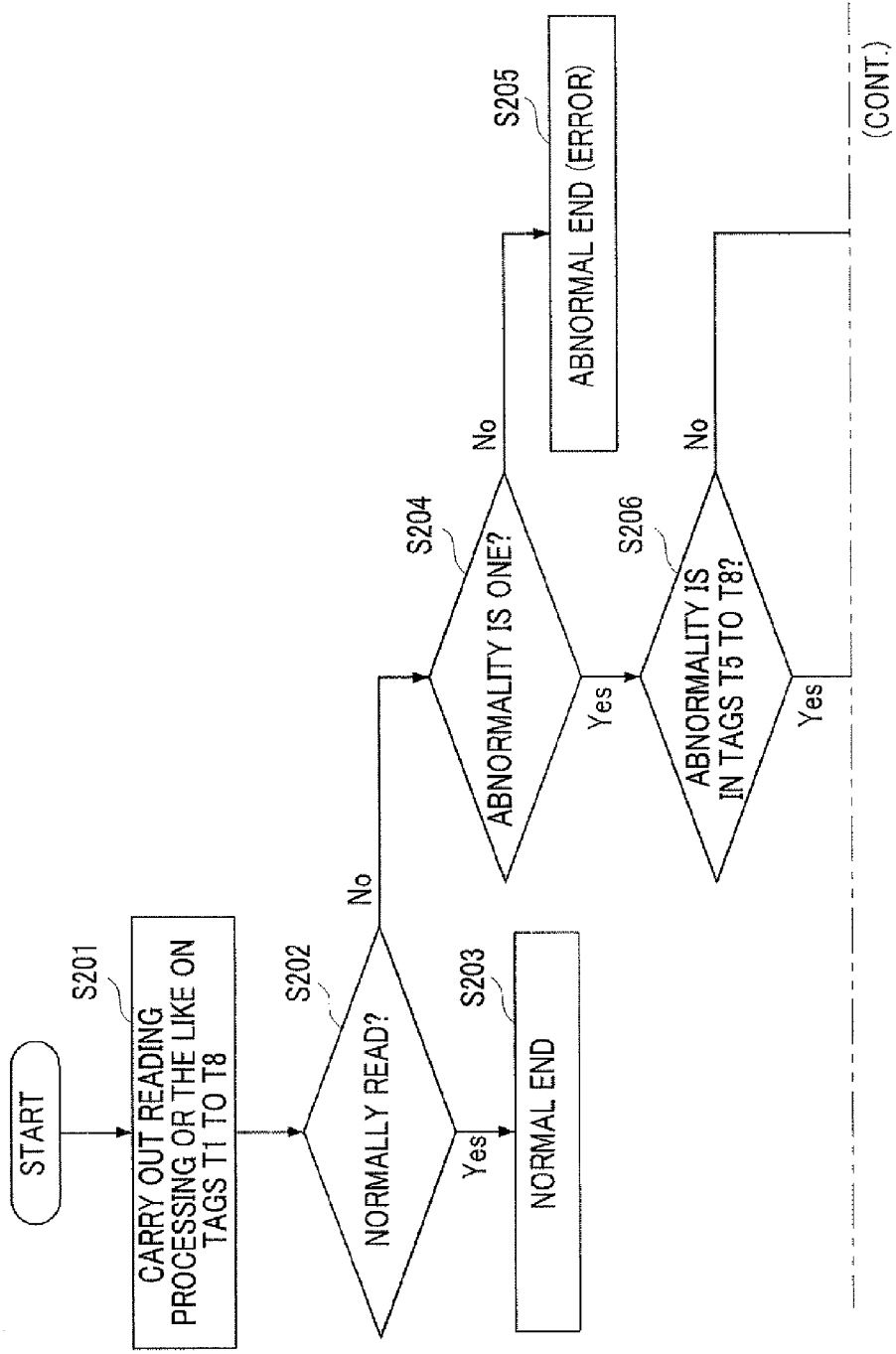
FIG. 17 is a flowchart for explaining the processing executed when a reader/writer section fails.

FIG. 17 is a flowchart for explaining the processing executed when a reader/writer section fails.

First, in the present exemplary embodiment, as described above, a sheet S transported from the upstream is stopped in a predetermined place such that the reader/writer sections 61 to 68, and the tags T1 to T8 of the sheet S face each other. Next, reading of identification information from the tags T1 to T8 and writing of detailed information to the tags T1 to T8 are performed (Step 201). In addition, at the time of the reading processing and the writing processing, as described above, the reader/writer sections 62, 64, 65, and 67 first operate, and then, the reader/writer sections 61, 63, 66, and 68 operate.

Next, the control section 91 as an example of a determination unit determines whether or not the reading of the identification information from the tags T1 to T8 and the writing of the detailed information to the tags T1 to T8 have been performed normally (Step 202). Here, whether or not the reading of the identification information is performed is determined, for example depending on whether or not the amount of information acquired is larger than a predetermined amount of information. Here, the identification information has a fixed amount of information. It may be considered that the identification information may not be acquired when the amount of information acquired is smaller than a predetermined amount of information. Additionally, whether or not the writing of the detailed information is performed may be determined depending on whether or not information is read from the tags T1 to T8 and the read information coincides with the information when the writing processing to the tags T1 to T8 is performed.

Here, when it is determined in Step 202 that the reading of the identification information and the writing of the detailed information has been performed normally, the processing is ended as is (Step 203). On the other hand, when it is not determined that the reading of the identification information and the writing of the detailed information has been performed in Step 202, it is determined whether or not the number of abnormal parts is one (Step 204). When an abnormal part is not determined to be one (i.e., when there are plural abnormal parts), the display panel 4a (refer to FIG. 1) performs error display, and the processing is ended as it is (Step 205). In addition, although the case where display is performed by the display panel 4a is illustrated in the present exemplary embodiment, the reader/writer apparatus 2 may be provided with a display panel, and error display may be performed in the reader/writer apparatus 2.

On the other hand, when the number of abnormal parts is one, it is determined whether or not an abnormality has occurred in the tags T5 to T8 (Step 206). Additionally, it is determined whether or not an abnormality has occurred in the four tags T5 to T8 provided on the downstream in the transporting direction of the sheets S. When it is determined that an abnormality has occurred in any of the four tags T5 to T8, the control section 91 that functions as a portion of a moving unit transports (moves) a sheet S to the upstream in the transporting direction (Step 207), and causes the tags T5 to T8 to face the reader/writer sections 61 to 64. In addition, in the present exemplary embodiment, a gap is formed between the sheet S transported to the upstream, and another sheet S which stands by on the upstream side of this sheet S, so that the sheet S transported to the upstream and the other sheets S does not interfere with each other.

On the other hand, when it is not determined that an abnormality has occurred in any of the four tags T5 to T8, that is, when an abnormality has occurred in the four tags T1 to T4 provided on the upstream in the transporting direction of the sheets S, a sheet S is transported to the downstream side in the transporting direction (Step 208), and the tags T1 to T4 are made to face the reader/writer sections 65 to 68. Thereafter, reading of identification information from a tag T that an abnormality has occurred in, and writing of detailed information to this tag T are performed (Step 209). Next, it is determined again whether or not the reading processing and the writing processing have been performed normally (Step 210).

In addition, whether or not the reading of the identification information has been performed normally may be determined, for example depending on whether or not the amount of information acquired is larger than a predetermined amount of information, similarly to the above. Additionally, whether or not the writing of the detailed information has been performed may be determined depending on whether or not the information read from the tags T coincides with the information when writing to the tags T is performed, similarly to the above. Then, when it is determined in Step 210 that the reading processing and the writing processing have been performed, the control section 91 that also functions as a portion of the display units displays a message indicating that the processing capacity of the apparatus declines, on the display panel 4*a* (Step 211), and ends the processing.

When reading processing or the like can be performed in a reader/writer section different from a reader/writer section that has performed first processing, the possibility that the reader/writer sections that have performed the first processing may fail becomes high. For this reason, in the present exemplary embodiment, when it is determined that reading processing and writing processing have been completed in Step 210, a message indicating that the processing capacity of the apparatus declines is displayed. In addition, a message indicating that a portion of the apparatus fails may also be displayed. Additionally, information on the failure of the apparatus is displayed in Step 211.

On the other hand, when it is not determined in Step 210 that the reading processing and the writing processing have been performed, information about the failure of a tag T is displayed (Step 212). More specifically, for example, a message indicating that a defect occurs on the sheet S is displayed on the display panel 4*a*, and a message indicating that second reading processing and writing processing are necessary using a new sheet S is displayed. This is because a failure occurs not on the reader/writer sections 61 to 68 side but on the tags T side when it is determined even in Step 210 that the reading processing and the writing processing may not be performed. In addition, for example, a message indicating that seven tags T of the eight tags T1 to T8 are normal and the seven tags T may be available may be displayed on the display panel 4*a*.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A wireless tag processor comprising:
   a radio wave transmitting unit that has a plurality of rows of transmitting part groups each having a plurality of transmitting parts that transmits radio waves, the transmitting parts being aligned along a first direction, and the groups being provided in a second direction crossing the first direction, and that transmits radio waves to a wireless tag provided on a medium; and
   a control section that makes radio waves be transmitted from a plurality of the transmitting parts that is arranged staggered among two rows of the transmitting parts included in the transmitting part groups that are adjacent to each other in the second direction crossing the first direction, and then, makes radio waves be transmitted from other transmitting parts included in the two rows of transmitting parts.

2. The wireless tag processor according to claim 1, wherein the control section makes radio waves be transmitted from the plurality of the transmitting parts that is arranged staggered when making radio waves be transmitted from the other transmitting parts.

3. The wireless tag processor according to claim 2, further comprising:
   a transporting unit that transports the medium,
   wherein the transporting unit stops the medium in a location that faces the transmitting parts when transmission of radio waves by the transmitting parts is performed.

4. The wireless tag processor according to claim 3,
   wherein each of a plurality of the transmitting parts provided at the radio wave transmitting unit is provided so as to face each of a plurality of the wireless tags provided on the medium,
   wherein a determination unit is provided to determine, for every wireless tag, whether or not at least one of writing of information to the wireless tags and reading of information from the wireless tags, using radio waves transmitted from the transmitting parts, has been performed normally, and
   wherein a moving unit is provided to move the medium such that the wireless tags for which the determination unit determines that at least one of the writing or the reading has not been performed normally face transmitting parts different from the transmitting parts that have transmitted radio waves to the wireless tags.

5. The wireless tag processor according to claim 4,
   wherein the determination unit determines again whether or not at least one of the writing of information to the wireless tags and the reading of information from the wireless tags, using the radio waves transmitted from the different transmitting parts has been performed normally.

6. The wireless tag processor according to claim 5, further comprising:
   a display unit that displays information on the failure of the wireless tag processor when it is determined that at least one of the writing and the reading has been performed normally in second determination, and on the failure of the wireless tags when it is determined that at least one of the writing and the reading has not been performed normally in the second determination.

7. The wireless tag processor according to claim 2,
   wherein each of a plurality of the transmitting parts provided at the radio wave transmitting unit is provided so as to face each of a plurality of the wireless tags provided on the medium,
   wherein a determination unit is provided to determine, for every wireless tag, whether or not at least one of writing of information to the wireless tags and reading of information from the wireless tags, using radio waves transmitted from the transmitting parts, has been performed normally, and
   wherein a moving unit is provided to move the medium such that the wireless tags for which the determination unit determines that at least one of the writing and the reading has not been performed normally face transmitting parts different from the transmitting parts that have transmitted radio waves to the wireless tags.

8. The wireless tag processor according to claim 7,
   wherein the determination unit determines again whether or not at least one of the writing of information to the wireless tags and the reading of information from the wireless tags, using the radio waves transmitted from the different transmitting parts has been performed normally.

9. The wireless tag processor according to claim 8, further comprising:

a display unit that displays information on the failure of the wireless tag processor when it is determined that at least one of the writing and the reading has been performed normally in second determination, and on the failure of the wireless tags when it is determined that at least one of the writing and the reading has not been performed normally in the second determination.

10. The wireless tag processor according to claim further comprising:
a transporting unit that transports the medium,
wherein the transporting unit stops the medium in a location that faces the transmitting parts when transmission of radio waves by the transmitting parts is performed.

11. The wireless tag processor according to claim 10,
wherein each of a plurality of the transmitting parts provided at the radio wave transmitting unit is provided so as to face each of a plurality of the wireless tags provided on the medium,
wherein a determination unit is provided to determine, for every wireless tag, whether or not at least one of writing of information to the wireless tags and reading of information from the wireless tags, using radio waves transmitted from the transmitting parts, has been performed normally, and
wherein a moving unit is provided to move the medium such that the wireless tags for which the determination unit determines that at least one of the writing and the reading has not been performed normally face transmitting parts different from the transmitting parts that have transmitted radio waves to the wireless tags.

12. The wireless tag processor according to claim 11,
wherein the determination unit determines again whether or not at least one of the writing of information to the wireless tags and the reading of information from the wireless tags, using the radio waves transmitted from the different transmitting parts has been performed normally.

13. The wireless tag processor according to claim 12, further comprising:
a display unit that displays information on the failure of the wireless tag processor when it is determined that at least one of the writing and the reading has been performed normally in second determination, and on the failure of the wireless tags when it is determined that at least one of the writing and the reading has not been performed normally in the second determination.

14. The wireless tag processor according to claim 1,
wherein each of a plurality of the transmitting parts provided at the radio wave transmitting unit is provided so as to face each of a plurality of the wireless tags provided on the medium,
wherein a determination unit is provided to determine, for every wireless tag, whether or not at least one of writing of information to the wireless tags and reading of information from the wireless tags, using radio waves transmitted from the transmitting parts, has been performed normally, and
wherein a moving unit is provided to move the medium such that the wireless tags for which the determination unit determines that at least one of the writing and the reading has not been performed normally face transmitting parts different from the transmitting parts that have transmitted radio waves to the wireless tags.

15. The wireless tag processor according to claim 14,
wherein the determination unit determines again whether or not at least one of the writing of information to the wireless tags and the reading of information from the wireless tags, using the radio waves transmitted from the different transmitting parts has been performed normally.

16. The wireless tag processor according to claim 15, further comprising:
a display unit that displays information on the failure of the wireless tag processor when it is determined that at least one of the writing and the reading has been performed normally in second determination, and on the failure of the wireless tags when it is determined that at least one of the writing and the reading has not been performed normally in the second determination.

17. A wireless tag processor comprising:
a radio wave transmitting unit that has a plurality of rows of transmitting part groups each having a plurality of transmitting parts that transmits radio waves, the transmitting parts being aligned along a first direction, and the groups being provided in a second direction crossing the first direction, and that transmits radio waves to a wireless tag provided on a medium; and
a control section that makes a control such that radio waves are made to be transmitted from first transmitting parts of a plurality of the transmitting parts, and during the transmission, the transmitting parts are not adjacent to each other in the first direction and the transmitting parts are not adjacent to each other in a second direction crossing the first direction, and makes a control such that radio waves are made to be transmitted from second transmitting parts after radio waves are made to be transmitted from the first transmitting parts, and during the transmission, the transmitting parts are not adjacent to each other in the first direction and the transmitting parts are not adjacent to each other in the second direction crossing the first direction.

18. The wireless tag processor according to claim 17,
wherein the control section makes a control such that, when radio waves are made to be transmitted from the first transmitting parts, the transmitting parts that perform transmission of radio waves in a first transmitting part group of the two transmitting part groups that are adjacent to each other and the transmitting parts that perform transmission of radio waves in a second transmitting part group are different from each other, and makes a control such that, when radio waves are made to be transmitted from the second transmitting parts, the transmitting parts that perform transmission of radio waves in the first transmitting part group and the transmitting parts that perform transmission of radio waves in the second transmitting part group are different from each other.

* * * * *